United States Patent
Kramer et al.

(10) Patent No.: US 10,911,394 B2
(45) Date of Patent: Feb. 2, 2021

(54) MITIGATING ABUSE IN AN ELECTRONIC MESSAGE DELIVERY ENVIRONMENT

(71) Applicant: HubSpot Inc., Cambridge, MA (US)

(72) Inventors: Jake Kramer, Cambridge, MA (US); Xi Wang, Needham, MA (US); Tom Monaghan, Dorchester, MA (US); Paul Weston, Billerica, MA (US); Mark Greene, Boston, MA (US)

(73) Assignee: HUBSPOT, INC., Cambridge, MA (US)

(*) Notice: Subject to any disclaimer, the term of this patent is extended or adjusted under 35 U.S.C. 154(b) by 380 days.

(21) Appl. No.: 15/884,268

(22) Filed: Jan. 30, 2018

(65) Prior Publication Data

US 2018/0219820 A1 Aug. 2, 2018

Related U.S. Application Data

(60) Provisional application No. 62/451,974, filed on Jan. 30, 2017.

(51) Int. Cl.
*H04L 12/58* (2006.01)
*G06Q 10/10* (2012.01)
(Continued)

(52) U.S. Cl.
CPC .............. *H04L 51/34* (2013.01); *G06N 3/08* (2013.01); *G06N 7/005* (2013.01); *G06N 20/00* (2019.01);
(Continued)

(58) Field of Classification Search
CPC ......... H04L 51/34; H04L 51/08; H04L 51/18; H04L 51/12; H04L 51/22; H04L 61/2007;
(Continued)

(56) References Cited

U.S. PATENT DOCUMENTS 7,580,982 B2 8/2009 Owen et al.
7,584,114 B2 9/2009 Estrada et al.
(Continued)

FOREIGN PATENT DOCUMENTS

WO 2016156858 A1 10/2016
WO 2018089619 A1 5/2018
(Continued)

OTHER PUBLICATIONS

PCT/U918/32348, "International Application Serial No. PCT/US18/32348, International Preliminary Report on Patentability dated Nov. 21, 2019", HubSpot, Inc., 9 pages.
(Continued)

*Primary Examiner* — David R Lazaro
(74) *Attorney, Agent, or Firm* — GTC Law Group PC & Affiliates

(57) ABSTRACT

Provided herein is an electronic message management platform that enables calculating a size of a sample of a message recipient list that delivers a confidence level greater than threshold for the entire message recipient list by applying a predicted bounce percent for the list to a sample size selection algorithm, selecting a total of recipients in the message recipient list that is consistent with the sample size, processing messages to each of the recipients in the sample, monitoring message life cycle events for the recipients in the sample set over a period of time, and based on the monitoring taking an action with the message recipient list selected from a list of recipient list actions consisting of processing remaining recipients in the message recipient list and halting processing of the message recipient list.

5 Claims, 10 Drawing Sheets

(51) Int. Cl.
*G06N 20/00* (2019.01)
*G06N 3/08* (2006.01)
*G06Q 30/02* (2012.01)
*H04L 29/12* (2006.01)
*G06N 7/00* (2006.01)

(52) U.S. Cl.
CPC ....... *G06Q 10/107* (2013.01); *G06Q 30/0248* (2013.01); *G06Q 30/0277* (2013.01); *H04L 51/08* (2013.01); *H04L 51/12* (2013.01); *H04L 51/18* (2013.01); *H04L 51/22* (2013.01); *H04L 51/28* (2013.01); *H04L 61/2007* (2013.01)

(58) Field of Classification Search
CPC .......... H04L 51/28; G06N 3/08; G06N 20/00; G06N 7/005; G06Q 30/0248; G06Q 30/0277; G06Q 10/107
See application file for complete search history.

(56) References Cited

U.S. PATENT DOCUMENTS

| | | | |
|---|---|---|---|
| 7,792,835 B2* | 9/2010 | Bohannon | G06F 16/2456 707/737 |
| 7,831,676 B1 | 11/2010 | Nagar | |
| 7,984,297 B2* | 7/2011 | Bohannon | H04L 51/34 713/170 |
| 8,224,902 B1 | 7/2012 | Glasser et al. | |
| 8,719,356 B2* | 5/2014 | Dillingham | H04L 51/34 709/206 |
| 9,304,862 B2* | 4/2016 | Simon | H04L 12/1868 |
| 9,356,947 B2 | 5/2016 | Shraim et al. | |
| 10,115,060 B2* | 10/2018 | Chestnut | G06N 20/00 |
| 2002/0199194 A1 | 12/2002 | Ali et al. | |
| 2003/0097617 A1 | 5/2003 | Goeller et al. | |
| 2003/0208472 A1 | 11/2003 | Pram | |
| 2004/0034652 A1 | 2/2004 | Hofmann et al. | |
| 2004/0111327 A1 | 6/2004 | Kidd et al. | |
| 2004/0260621 A1 | 12/2004 | Foster et al. | |
| 2005/0210111 A1 | 9/2005 | Fukudome | |
| 2005/0265319 A1 | 12/2005 | Clegg et al. | |
| 2006/0095556 A1 | 5/2006 | Arnold et al. | |
| 2006/0212931 A1 | 9/2006 | Shull et al. | |
| 2006/0242140 A1 | 10/2006 | Wnek et al. | |
| 2007/0011073 A1 | 1/2007 | Gardner et al. | |
| 2007/0136430 A1 | 6/2007 | Qureshi et al. | |
| 2007/0203996 A1 | 8/2007 | Davitz et al. | |
| 2007/0299777 A1 | 12/2007 | Shraim et al. | |
| 2008/0027951 A1* | 1/2008 | Bohannon | G06F 16/2456 |
| 2008/0034432 A1* | 2/2008 | Bohannon | H04L 51/34 726/23 |
| 2008/0168269 A1 | 7/2008 | Wilson | |
| 2009/0019003 A1* | 1/2009 | Bohannon | G06Q 30/02 |
| 2009/0138711 A1 | 5/2009 | Heimbigner | |
| 2009/0248813 A1 | 10/2009 | Sawhney | |
| 2010/0161506 A1 | 6/2010 | Bosenick et al. | |
| 2010/0161735 A1 | 6/2010 | Sharma | |
| 2010/0186088 A1 | 7/2010 | Banerjee et al. | |
| 2010/0235915 A1 | 9/2010 | Memon et al. | |
| 2010/0312837 A1 | 12/2010 | Bodapati et al. | |
| 2011/0179067 A1 | 7/2011 | Dalvi et al. | |
| 2011/0258218 A1* | 10/2011 | Hayes | G06Q 10/107 707/769 |
| 2012/0053887 A1 | 3/2012 | Nurmi | |
| 2012/0191546 A1 | 7/2012 | Phelan et al. | |
| 2012/0316904 A1 | 12/2012 | Eder | |
| 2013/0073336 A1 | 3/2013 | Heath | |
| 2013/0138555 A1 | 5/2013 | Shishkov | |
| 2013/0339456 A1 | 12/2013 | Nikolayev et al. | |
| 2014/0006139 A1 | 1/2014 | Aggarwal et al. | |
| 2014/0025683 A1 | 1/2014 | Howland et al. | |
| 2014/0025763 A1 | 1/2014 | Furlong et al. | |
| 2014/0258169 A1 | 9/2014 | Wong et al. | |
| 2014/0372363 A1* | 12/2014 | Chestnut | H04L 51/12 706/52 |
| 2015/0006647 A1 | 1/2015 | Steinberg et al. | |
| 2015/0019910 A1 | 1/2015 | Simon et al. | |
| 2015/0032826 A1 | 1/2015 | Gunaratnam | |
| 2015/0032827 A1 | 1/2015 | Tyler et al. | |
| 2015/0100896 A1 | 4/2015 | Shmarovoz et al. | |
| 2015/0154664 A1 | 6/2015 | Dawson et al. | |
| 2015/0188874 A1 | 7/2015 | Feinstein | |
| 2015/0237061 A1* | 8/2015 | Shraim | H04L 63/1491 726/22 |
| 2015/0286357 A1 | 10/2015 | Penha et al. | |
| 2015/0312187 A1 | 10/2015 | Menna et al. | |
| 2015/0381552 A1 | 12/2015 | Vijay et al. | |
| 2016/0012364 A1 | 1/2016 | Filgueiras | |
| 2016/0020917 A1 | 1/2016 | Tuatini et al. | |
| 2016/0036750 A1 | 2/2016 | Yuan et al. | |
| 2016/0119260 A1 | 4/2016 | Ghafourifar et al. | |
| 2016/0226808 A1 | 8/2016 | Lin | |
| 2016/0232540 A1 | 8/2016 | Gao et al. | |
| 2016/0307191 A1 | 10/2016 | Turgeman et al. | |
| 2016/0359793 A1* | 12/2016 | Kraios | H04L 51/12 |
| 2017/0005954 A1 | 1/2017 | Shaltiel et al. | |
| 2017/0221089 A1* | 8/2017 | Zhu | G06Q 30/0201 |
| 2017/0264577 A1 | 9/2017 | Ganin et al. | |
| 2017/0317962 A1 | 11/2017 | Chen | |
| 2017/0337569 A1 | 11/2017 | Sasson | |
| 2017/0353410 A1 | 12/2017 | Gonzales | |
| 2018/0097759 A1* | 4/2018 | Brechbuhl | G06F 16/248 |
| 2018/0137203 A1 | 5/2018 | Hennekey et al. | |
| 2018/0219818 A1* | 8/2018 | Kramer | G06N 7/005 |
| 2018/0219819 A1* | 8/2018 | O'Brien | H04L 51/18 |
| 2018/0219820 A1* | 8/2018 | Kramer | H04L 51/18 |
| 2018/0219829 A1* | 8/2018 | Kebinger | H04L 51/22 |
| 2018/0219830 A1* | 8/2018 | O'Brien | G06N 7/005 |
| 2018/0336495 A1* | 11/2018 | Chestnut | H04L 51/12 |
| 2019/0347668 A1 | 11/2019 | Williams et al. | |
| 2020/0036673 A1* | 1/2020 | O'Brien | H04L 51/28 |
| 2020/0065857 A1 | 2/2020 | Lagi et al. | |
| 2020/0210867 A1 | 7/2020 | Banis et al. | |
| 2020/0244615 A1* | 7/2020 | O'Brien | G06Q 30/0248 |

FOREIGN PATENT DOCUMENTS

WO 2018140975 A1 8/2018
WO 2018209254 A1 11/2018

OTHER PUBLICATIONS

PCT/US18/32348, "International Application Serial No. PCT/US18/32348, International Search Report and Written Opinion dated Jul. 30, 2018", HubSpot, Inc., 10 Pages.
PCT/US2017/060835, "International Application Serial No. PCT/US2017/060835, International Preliminary Report on Patentability dated May 23, 2019", HubSpot, Inc., 7 pages.
PCT/US2018/016038, "International Application Serial No. PCT/US2018/016038, International Preliminary Report on Patentability dated Aug. 8, 2019", HubSpot, Inc., 8 pages.
PCT/US2017/060835, "International Application Serial No. PCT/US2017/060835, International Search Report and Written Opinion dated Feb. 14, 2018", HubSpot Inc.
PCT/US2018/016038, "International Application Serial No. PCT/US2018/016038, International Search Report and the Written Opinion dated May 29, 2018.", HUBSPOT INC., 12 pages.
PCT/US2018/016038, "International Application Serial No. PCT/US2018/016038, Invitation to Pay Additional Fees and, Where Applicable, Protest Fee mailed on Apr. 02, 2018", Hubspot Inc., 3 pages.
U.S. Appl. No. 15/884,247, filed Jan. 30, 2018, Pending.
U.S. Appl. No. 15/884,251, filed Jan. 30, 2018, Pending.
U.S. Appl. No. 15/884,264, filed Jan. 30, 2018, Pending.
U.S. Appl. No. 15/884,273, filed Jan. 30, 2018, Pending.
PCT/US18/016038, Jan. 30, 2018, Pending.

(56) References Cited

OTHER PUBLICATIONS

PCT/US18/032348, May 11, 2018, Pending.

\* cited by examiner

MITIGATING ABUSE IN AN ELECTRONIC MESSAGE DELIVERY ENVIRONMENT

CLAIM TO PRIORITY

This application claims the benefit of the following provisional applications, each of which is hereby incorporated by reference in its entirety: U.S. Ser. No. 62/451,974, filed Jan. 30, 2017.

BACKGROUND

Field

The present application relates to the automated processing of electronic messages, e.g. electronic mail messages, and other content in a network-connected computing environment.

Description of the Related Art

A notable application of modern digital communication networks is for exchanging electronic messages between parties connected to such networks. Electronic mail (sometimes "email") message traffic is ubiquitous in personal and professional interactions. Email campaigns are widely used by enterprises and marketers, among others, to reach groups of current and prospective customers; however, problems with some campaigns (e.g., "spam," computer viruses, intentional attacks like hacking, phishing, and social engineering, and others) have led to a variety of efforts to limit unwanted messages, such as spam filters, blacklists (such as of sending email domains, IP addresses, or the like), and the like) in some email campaigns has led to a variety of efforts to mitigate these problems, such as to halt or reduce the proliferation of spam over the electronic messaging networks. However, these efforts present obstacles to parties undertaking legitimate email campaigns and can prevent recipients from receiving valuable electronic messaging content contained in such campaigns. A need exists for improved methods and systems that facilitate management and execution of electronic message campaigns while appropriately managing challenges presented by spam filters, black lists, domain blocking technologies, and the like.

Networked-based message communication infrastructure elements exist to facilitate handling blocks of electronic mail messages, including message transfer agents (MTAs) that relay messages that are sent from sets of sender IP addresses to one or more lists of recipient email addresses. Systems exist that retry sending electronic messages, such as when they "bounce" from a recipient domain for one of various reasons. However, such systems fail to account for various factors, such as the quality of one or more of the parties or entities involved in a campaign, dynamic conditions involved in the communication infrastructure used for a campaign, the likelihood that a recipient will engage with a message, or the like. A need exists for more sophisticated methods and systems for managing a campaign based on various factors, including dynamic conditions, quality measures, and engagement factors.

SUMMARY

Provided herein are methods, systems, services, applications, programs, processes, devices, functions, modules, components, interfaces, and other elements (collectively referred to herein in some cases as the "platform" or the "electronic message management system," which should be understood interchangeably except where context indicates otherwise) that facilitate management and execution of electronic message campaigns while appropriately managing challenges presented by spam filters, black lists, domain blocking technologies, and the like. In embodiments, the platform includes elements for managing an electronic message campaign based on dynamic conditions, quality measures, engagement factors, and other measures, factors and conditions.

In embodiments, the platform enables the end-to-end management of an electronic message campaign throughout the life cycle of a message, including: various interfaces by which one or more messages for a campaign may be entered into a campaign (such as by ingestion or delivery of a batch of emails, integration with one or more work flows (such as lead flows in a sales or marketing campaign); the sequence of events associated with sending a message, such as via a message transfer agent (e.g., a "send-call" sequence involving filtering and locking a recipient list, attempting to send an email, handling returns, resending emails, annotation, routing, and the like); and other events that occur throughout the lifecycle of an email (e.g., being sent, dropped, bounced, processed, read, forwarded, replied-to, opened, downloaded, and the like).

In embodiments the platform enables smart, dynamic routing for an email campaign, including routing through varied quality bands (e.g., bands associated with particular servers or other network nodes, bands associated with sending IP addresses, bands associated with various available MTAs, and the like), selection of routing within infrastructures that include multiple available MTAs, intelligent management of sending and retry rates for a campaign (including based on various indicators of quality of senders, receivers and the like, as well as based on factors of engagement); intelligent ramping up of new IP addresses for a sender involved in a campaign, and the like.

In embodiments the platform enables quality-based routing, such as based on scoring and metrics, including based on integration with and taking of various inputs from a customer relationship management (CRM) system, as well as using IP bands based on quality tranches, such as using logistic regression and beta distribution techniques.

In embodiments, the platform includes an MTA router, including automatically monitoring success of retry events and making new attempts at the right time, throttling the rate at which emails are sent and/or retried, managing response workers, handling duration tracking, and involving a learning mechanism for concurrency.

In embodiments, the platform enables abuse mitigation, including handling how to determine whether an email is a good email, whether the email should be sent or suppressed, mitigating cross-impact between campaigns (such as by sending questionable emails from a separate IP addresses), handling of chunk sending situations, detection and management of spam traps, portal scoring, and the like.

The present disclosure is further directed to, inter alia, processing, routing and handling of electronic message traffic. Some embodiments of the present invention are directed to a method for processing of electronic mail messages in a communication network environment, comprising receiving an electronic mailing list from a user including a plurality of electronic mail addresses corresponding to a plurality of intended message recipients; analyzing the electronic mailing list at a mail processing server, including by comparing the plurality of electronic mail addresses to prior stored data accessible by said mail processing server; if the electronic mailing list is determined, based on said analysis, fails to satisfy a required criterion for list acceptance, or satisfies a criterion for list rejection, rejecting the electronic mailing list entirely; if the electronic mailing list is not rejected entirely as recited above, but one or more electronic mail addresses fail to satisfy a required criterion for address acceptance, or satisfy a criterion for address rejection, removing said one or more electronic mail addresses from the electronic mailing list so as to yield an accepted electronic mailing list comprising some or all of the addresses in said electronic mailing list; the mail processing server incorporating each address in said accepted electronic mailing list into a respective electronic mail message template to generate a plurality of outgoing electronic mail messages, to each of said intended message recipients in the accepted electronic mailing list, said outgoing electronic messages each containing a respective unique embedded message tag unique thereto and an embedded page tag corresponding to a respective uniform resource locator (URL) accessible by the respective message recipient over said communication network environment; the mail processing server sending each of said electronic mail messages to the respective message recipients in said accepted electronic mailing list, through one or more mail transfer agents and electronic mail service providers, using the respective electronic mail addresses of the message recipients; wherein the mail processing server monitors for a message activation signal indicating that a given message recipient has opened the respective electronic mail message sent to that message recipient thereby activating the unique embedded message tag therein; and wherein the mail processing server further monitors for a page activation signal indicating that the given message recipient has visited a web page corresponding to the URL encoded in the electronic mail message sent to said given recipient thereby activating the embedded page tag therein.

In embodiments, a method for managing sending of a batch of emails via at least one message transfer authority may include receiving a message recipient list, may include receiving a message to be sent to the recipient list, may include evaluating a message delivery readiness indicator for at least one recipient in the received recipient list. Based on a result of the evaluating, the method may include removing one or more recipients, if any, for which the message readiness indicator does not indicate readiness, locking the recipient list from further changes, generating a message based on the received message for each of at least a portion of the recipients in the recipient list, calculating a probability of engagement metric for each generated message, the metric including a probability of recipient engagement. The method for managing sending a batch of emails may include determining, based on the probability of engagement, at least one of: at least one node and IP address of a networked server in an Internet Protocol-based network from which the generated message will originate; and at least one message transfer agent for transferring the message to the at least one recipient. The method for managing sending a batch of emails may also include coordinating the networked sever to send the generated message from the IP address via the at least one determined message transfer agent, and repeating the steps of calculating, determining and coordinating until all messages in the portion of the recipients have been forwarded to a message transfer agent. In embodiments, sending a batch of messages may include include unlocking the recipient list when bytes of all messages in the portion of the recipients have been received by at least one message transfer agent. In embodiments, the probability of engagement may be a calculation of a likelihood that a recipient will open the message. In embodiments, receiving a message recipient list may include ingesting the list, and generating a recipient contact record for each recipient in the list for which a recipient contact record does not exist and updating a recipient contact record based on a comparison of recipient information in the recipient list with a corresponding recipient contact record for each recipient for which a recipient contact record exists. In embodiments, the recipient contact record may be compared to a contact record in a contact management system of an enterprise. In embodiments, receiving a message recipient list comprises executing an application programming interface (API) function to process a call made to the API from a client messaging server. In embodiments, receiving a message recipient list comprises requesting information for at least one recipient from a client message application by accessing an API of the client message application. In embodiments, receiving a message recipient list comprises accessing a workflow of a client server. In embodiments, receiving a message recipient list comprises processing a script that enables access to recipient list information on a client server.

In embodiments, receiving a message recipient list comprises receiving a plurality of mutually exclusive recipient lists that separate included recipients from excluded recipients. In embodiments, receiving a message recipient list comprises tagging each recipient information record as one of included, excluded, suppressed, bad, malicious, and unreachable.

In embodiments, methods and systems may include a message recipient list interface adapted to receive recipient lists in a plurality of formats, may include a message interface through which a client provides message content, a message delivery readiness filtering module that operates to prevent delivery of messages to recipients in the list if a message delivery readiness indicator indicates delivery of messages to recipients in the list should be blocked or delayed, a message generation module that generates a message for each of at least a portion of the recipients in the recipient list based on the message content and message routing and control information, a message route determination module that determines at least one of a sending IP address and a message transfer agent between which the generated message will be routed, wherein the determination of at least one of the a sending address and the message transfer agent may be determined dynamically based on at least one indicator relating to at least one of the delivery of messages, the rejection of messages, and the engagement with messages handled by the system, a processor for executing at least one of the filtering module, the generation module, and the route determination module; and a message transfer agent node connected to a server executing the message route preparation module, wherein the message transfer agent node receives a message for at least one recipient in the recipient list, configures the message for routing over the IP-based network, and routes the configured message based on the prepared route.

In embodiments, the system may further include a recipient engagement probability calculating model that generates a probably of recipient engagement for each of a portion of the recipients in the recipient list. I embodiments, the processor may be further adapted to generate a recipient contact record for each recipient in the list for which a recipient contact record does not exist and updating a recipient contact record based on a comparison of recipient information in the recipient list with a corresponding recipient contact record for each recipient for which a recipient contact record exists. In embodiments, the message recipient list interface module comprises an Application Programming Interface that processes calls to the message recipient list interface from a client messaging server. In embodiments, the message recipient list interface module performs an API call to a client messaging server requesting at least one message recipient information. In embodiments, the message recipient list interface module receives a plurality of recipient lists and determines for each list if the recipients on the list should be included or excluded from receiving the received message. In embodiments, the processor may be further adapted to calculate an engagement metric for each generated message may include a probability of recipient engagement. In embodiments, the system may further include a plurality of message transfer agent nodes. In embodiments, the route preparation module determines nodes through which the generated message will be routed based on a quality metric of the recipient. In embodiments, the route preparation module determines nodes through which the generate message will be routed based on a reputation of a networked server of the client.

In embodiments a method of managing a lifecycle of an electronic message may include preparing a message for delivery by adding at least one header value that facilitates identifying the message, may include updating links in the message to include metadata that facilitates identifying a recipient of the message, may include tracking and recording life cycle events throughout a delivery phase and an engagement phase of the lifecycle of the message, and determining at least one of a degree of engagement and a quality of engagement of the recipient with the message based on at least a portion of the tracked and recorded life cycle events. In embodiments, delivery phase life cycle events include at least one of send events, drop events, processing events, delivery events, deferred delivery events, and bounced delivery events. In embodiments, the engagement phase lifecycle events include at least one of message open events, message content link engagement events, message forward events, message reply events, duration of engagement events, and status change events. In embodiments, preparing a message for delivery may include updating attribute data of the message with at least one of recipient identification information and client sender identification information.

In embodiments, updating links in a message may include rewriting a link to include at least one of an encoding of a target URL in the link and meta data that facilitates a resource at the URL identifying a recipient of the message. In embodiments, tracking life cycle events may include detecting when data may include the prepared message has been transmitted from a system on which the message was prepared. In embodiments, an updated link comprises a link to a link resolution server that redirects access to the updated link to a URL that may be consistent with a target URL in the link. In embodiments, recording life cycle events comprises storing at least one of the at least one header value and the updated links in a message-specific lifecycle event storage facility accessible to a processor.

In embodiments, a method of preparing a route for a new message through a plurality of networked nodes in an Internet Protocol-based network may include calculating a recipient quality score based on at least one message engagement event for the recipient with respect to at least one past message, may include applying at least one model to determine a probability of the recipient engaging with the new message. In embodiments, based on at least one of the quality score and the determined probability, selecting among a plurality of available routes for the new message, wherein a route may include a sending IP address and a message transfer authority for the new message. In embodiments, the at least one model may be at least one of a logistic regression model and a beta distribution model that takes into account a number of messages sent to the recipient. In embodiments, the recipient quality score may be calculated based on a number of recipient open events and recipient message link engagement events recorded for the recipient. In embodiments, the recipient quality score may be calculated based on a reputation for a source of recipient contact information. In embodiments, the recipient quality score may be calculated based on availability of information in contact information for the recipient associated with recipient contact information fields may include at least one of first name, last name, industry, phone number, address, related contact, and social network identifier. In embodiments, the recipient quality score may be calculated based on recipient domain information. In embodiments, the recipient quality score may be calculated based on a measure of time since the last recorded message open event recorded for the recipient. In embodiments, the method of preparing a route may further include computing fixed percentiles for different routes based on message life cycle event activity for messages delivered over the different routes, determining a route-specific probability of engagement for each route based therein, and applying the determined route-specific probability of engagement when selecting a route. In embodiments, the method of preparing a route may further include selecting among a plurality of quality-specific tranches of available routes based on a prediction of the probability of engagement for the message. In embodiments, selecting a route for the message with the selected quality-specific tranche may include applying a machine learning system to determine which route produces a greater likelihood of engagement for parameters of the message than other routes in the tranche of routes.

In embodiments, a method of preparing a route for a new message through a plurality of networked nodes in an Internet Protocol-based network may include calculating a sender quality score based on at least one message engagement event by at least one recipient with respect to at least one message previously sent by the sender, applying at least one model to determine a probability of a recipient engaging with the new message based on the sender quality score, and based on at least one of the quality score and the determined probability, selecting among a plurality of available routes for the new message, wherein a route may include a sending IP address and a message transfer authority for the message. In embodiments, the at least one model may be at least one of a logistic regression model and a beta distribution model that takes into account a number of messages sent to the recipient. In embodiments, the sender quality score may be calculated based on a number of recipient open events and recipient message link engagement events recorded for the recipient. In embodiments, the sender quality score may be calculated based on a reputation of the sender determined a least in part by processing the sender's contact information. In embodiments, the sender quality score may be calculated based on availability of information in contact information for the sender associated with contact information fields may include at least one of first name, last name, industry, phone number, address, related contact, and social network identifier.

In embodiments, the sender quality score may be calculated based on sender domain information. In embodiments, the sender quality score may be calculated based on a measure of time since the last recorded message open event recorded for at least one of a message sent by the sender. In embodiments, the method of preparing a route may further may include computing fixed percentiles for different routes based on message life cycle event activity for messages delivered over the different routes, determining a route-specific probability of engagement for each route based therein, and applying the determined route-specific probability of engagement when selecting a route. In embodiments, the method of preparing a route may further may include selecting among a plurality of quality-specific tranches of available routes based on a prediction of the probability of engagement for the message. In embodiments, selecting a route for the message with the selected quality-specific tranche may include applying a machine learning system to determine which route produces a greater likelihood of engagement for parameters of the message than other routes in the tranche of routes.

In embodiments, a method of preparing a route for a new message through a plurality of networked nodes in an Internet Protocol-based network may include calculating a sender-recipient relationship quality score based on at least of a message engagement event for at least one of a sender and a recipient with respect to at least one past message and at least one record of interactions between a domain of the sender and a domain of the recipient, applying at least one model to determine a probability of a recipient engaging with the message based on the quality score, and based on at least one of the quality score and the determined probability, selecting among a plurality of available routes for the message, wherein a route may include a sending IP address and a message transfer authority for the message. In embodiments, the at least one model may be at least one of a logistic regression model and a beta distribution model that takes into account a number of messages sent to the recipient. In embodiments, the quality score may be calculated based on a number of recipient open events and recipient message link engagement events recorded for the recipient. In embodiments, the quality score may be calculated based on a reputation of at least one of the recipient and the sender determined a least in part by processing the sender's contact information. In embodiments, the quality score may be calculated based on availability of information in contact information for at least one of the recipient and the sender associated with contact information fields may include at least one of first name, last name, industry, phone number, address, related contact, and social network identifier.

In embodiments, the quality score may be calculated based on at least one of sender domain information and recipient domain information. In embodiments, the quality score may be calculated based on a measure of time since the last recorded message open event recorded for at least one of a message sent by the sender and a message received by the recipient. In embodiments, the method of preparing a route may further may include computing fixed percentiles for different routes based on message life cycle event activity for messages delivered over the different routes, determining a route-specific probability of engagement for each route based therein, and applying the determined route-specific probability of engagement when selecting a route. In embodiments, the method of preparing a route may further include selecting among a plurality of quality-specific tranches of available routes based on a prediction of the probability of engagement for the message. In embodiments, selecting a route for the message with the selected quality-specific tranche may include applying a machine learning system to determine which route produces a greater likelihood of engagement for parameters of the message than other routes in the tranche of routes.

In embodiments, a method for routing a message from an originating provider to a recipient may include processing a message with at least one of header information and signing keys, may include determining an IP address for an originator of the message by comparing identification for the originator with a table of IP addresses indexed by originator identification information, determining a message transfer agent to which the message may be directed from the IP address, forwarding the processed message to an SMTP service executing at the IP address, may include coordinating the sending of the processed message from the IP address to at least one message transfer agent, may include monitoring a server handling the IP address for a confirmation of delivery of the message to the recipient, and executing a message send retry protocol that retries sending the message to the recipient when a confirmation of no-delivery may be received. In embodiments, monitoring a server comprises executing a throttling application and an email response monitoring application to effect control of a rate at which new messages are sent from the originator based on a response to forwarding the processed message. In embodiments, the message send-retry protocol controls a rate of outgoing messages based on a rate of message delivery to a recipient. In embodiments, the rate of message delivery to a recipient may be optimized for a target level of retries. In embodiments, a delay before message retry to a recipient may be adjusted based on a type of message delivery failure. In embodiments, a delay duration before message retry may be selected based on whether a message may be indicated to have a DNS bounce, an IP reputation bounce or a throttling bounce. In embodiments, the message send retry protocol comprises applying machine learning to determine a delay before message retry that optimizes a count of retries for a message. In embodiments, the message send retry protocol comprises adding a connection between a message transfer agent and the originating sender IP address and trying to send the message over the added connection. In embodiments, the message send retry protocol comprises transferring the message to a secondary message transfer agent when a retry threshold may be exceeded. In embodiments, the retry threshold may be one of a count of retries and a duration of time since a message was originally sent. In embodiments, the message send retry protocol prepares and delivers a request for removal from a blacklist when a confirmation of no-delivery indicates the cause for no-delivery may be due to the message being detected as being sent from a blacklisted server.

In embodiments, a method of matching a throughput rate of a message management platform with a throttle rate of a recipient may include determining a rate at which messages sent to a recipient domain receive a throttling limit rejection by the recipient domain, and applying a proportional integral derivative algorithm to control a rate of message delivery to the recipient based on the determined throttling rate of the recipient domain, wherein the rate of change of the rate of message delivery reduces as the recipient domain throttling rate and the rate of message delivery converge.

In embodiments, a method of concurrent connection maximization may include increasing a quantity of logical connections between a source email sender and destination email recipient server, repeating the increasing quantity step while tracking the quantity of logical connections, may include receiving a connection refusal signal from the destination email recipient server and recording the tracked quantity of logical connections active when the connection refusal signal may be received, storing in a recipient status data set the quantity of logical connections active when the connection refusal signal may be received, and upon initiation of a new message send request to the recipient, configuring the number of logical concurrent connections stored for the recipient in the recipient status data set and sending messages over the concurrent connections within a threshold indicated by the stored number of logical concurrent connections.

In embodiments, a method of generating a quality score for a message recipient list may include receiving a recipient list, may include ingesting a recipient record for each of at least a portion of the recipients in the list, each recipient record having at least one recipient information field, and automatically processing the analyzed recipient record information fields to determine an expected percent of bounces for recipients in the list. In embodiments, automatically processing the analyzed recipient record may include using a probability prediction model. In embodiments, the model comprises and a regression model. In embodiments, automatically processing the analyzed recipient record may include using a machine learning system. In embodiments, the machine learning system may include at least one of a neural network and a deep learning system. In embodiments, automatically processing the analyzed recipient record may include using a hybrid of a model and a machine learning system. In embodiments, the method of generating a quality score may further include generating a rating for the recipient list that facilitates comparison of list quality for a plurality of recipient lists. In embodiments, analyzing the recipient record comprises checking for content in at least one of a first name field, a last name field, an industry field, an address field, and a related recipient field.

In embodiments, a method of scoring a client of a message management system may include calculating a client performance measure for a plurality of types of message life cycle events for messages sent on behalf of the client in a window of time, may include determining an industry associated with the client, may include comparing the measure for the client to an average measure for other clients associated with the determined industry, trending the client performance measure over time, and recommending a source of trend failure based on the trending of the client performance measure over time exceeding a trend failure threshold. In embodiments, the plurality of types of message life cycle events consists of bounces, spam rejections, recipient opens and recipient content clicks. In embodiments, the client performance measure may be calculated by adding the percent opens and percent clicks and subtracting the percent bounces and percent spam. In embodiments, recommending a source of trend failure comprises comparing a percent of new recipients in a recipient list processed in the window of time to a new recipient percent threshold and based on the comparison selecting a candidate source of trend failure from a list of candidate sources of trend failure.

In embodiments, a method may include calculating a size of a sample of a message recipient list that delivers a confidence level greater than threshold for the entire recipient list by applying a predicted bounce percent for the list to a sample size selection algorithm, may include selecting a total of recipients in the recipient list that may be consistent with the sample size, may include processing messages to each of the recipients in the sample set, may include monitoring message life cycle events for the recipients in the sample set over a period of time, and based on the monitoring taking an action with the recipient list selected from a list of recipient list actions consisting of processing the remaining recipients in the recipient list and halting processing of the recipient list. In embodiments, the period of time may be a number of minutes less than ten minutes. In embodiments, the period of time may be determined when a threshold percentage of recipients produce life cycle events that include a recipient message engagement event. In embodiments, the threshold may be greater than at least one of 90%, 95% and 99%. In embodiments, selecting the recipients comprises selecting recipients in an order in which they are stored in the recipient list.

In embodiments, a method of introducing a new sender resource for sending email messages that mitigates the risk that the resource may be marked for rejection of messages may include processing a list of recipients provided by the new sender with a quality scoring algorithm that detects recipients that score below a baseline new sender introductory score threshold, may include setting aside recipients as excluded from receiving messages from the sender during a new sender introduction phase based at least in part on the quality scoring algorithm, and sending messages to a subset of recipients that are not set aside in the list of recipients during the new sender introduction phase. In embodiments, the recipient quality scoring algorithm indicates to exclude recipients that have resulted in at least one hard bounce of a message previously send to the recipient. In embodiments, the quality score algorithm comprises calculating a recipient quality score based on at least one message engagement event for the recipient with respect to at least one past message. In embodiments, the quality score algorithm comprises applying at least one model to determine a probability of the recipient engaging with a message from the new sender and using the determined probability to identify recipients for excluding from message delivery during the introductory phase. In embodiments, the at least one model may be at least one of a logistic regression model and a beta distribution model. In embodiments, the introduction phase may be adjusted based on at least one of a rate of negative delivery events and rate of negative engagement events for messages sent during the introduction phase. In embodiments, the method of introducing a new sender may further include not sending messages to the recipients that are set aside during the new sender introduction phase. In embodiments, the method of introducing a new sender may further include adjusting the new sender introductory score based on a measure of recipient engagement with messages sent to the subset of recipients and sending messages to at least one of recipients that score lower and recipients that score higher than the baseline new sender introductory score threshold based on at least one of the adjusted new sender introductory score and a duration of time since initiation of sending messages from the new sender. In embodiments, the quality score algorithm determines a quality score based on a number of recipient open events and recipient message link engagement events recorded for the recipient. In embodiments, the quality score may be calculated based on a reputation for a source of recipient contact information. In embodiments, setting aside recipients may be based on a recipient status indicative of the message address of the recipient being invalid. In embodiments, setting aside recipients may be based on a recipient status indicative of the recipient opting out from receiving message from senders that are similar to the new sender. In embodiments, setting aside recipients may be based on a recipient status indicative of the recipient designating the new sender domain as a source of spam.

In embodiments a method of generating a sender policy framework (SPF) record may include preparing a list of Internet Protocol (IP) addresses to be included an SPF record for a domain, may include searching the list for IP addresses that can be represented as a continuous string of IP addresses, may include converting the IP addresses that can be represented as a continuous string from individual IP addresses to inclusive IP address group designators, may include using a knapsack algorithm, generating an SPF record that maximizes the number of IP addresses for a given SPF record size, storing the IP addresses identified by the knapsack algorithm into a first SPF record, and updating the SPF record with a reference to a subordinate SPF record based on the number of IP addresses in the list exceeding the maximum determined from the knapsack algorithm for the first SPF record. In embodiments, the second SPF record reference may include the domain plus an identifier that may be a whole number greater than the SPF record reference for the first SPF record. In embodiments, the method of generating an SPF record may further include repeating the converting, knapsack algorithm, storing and updating steps for the second SPF record. In embodiments, the updating step may be in response to at least one new IP address needing to be included in the SPF record for the domain.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1:
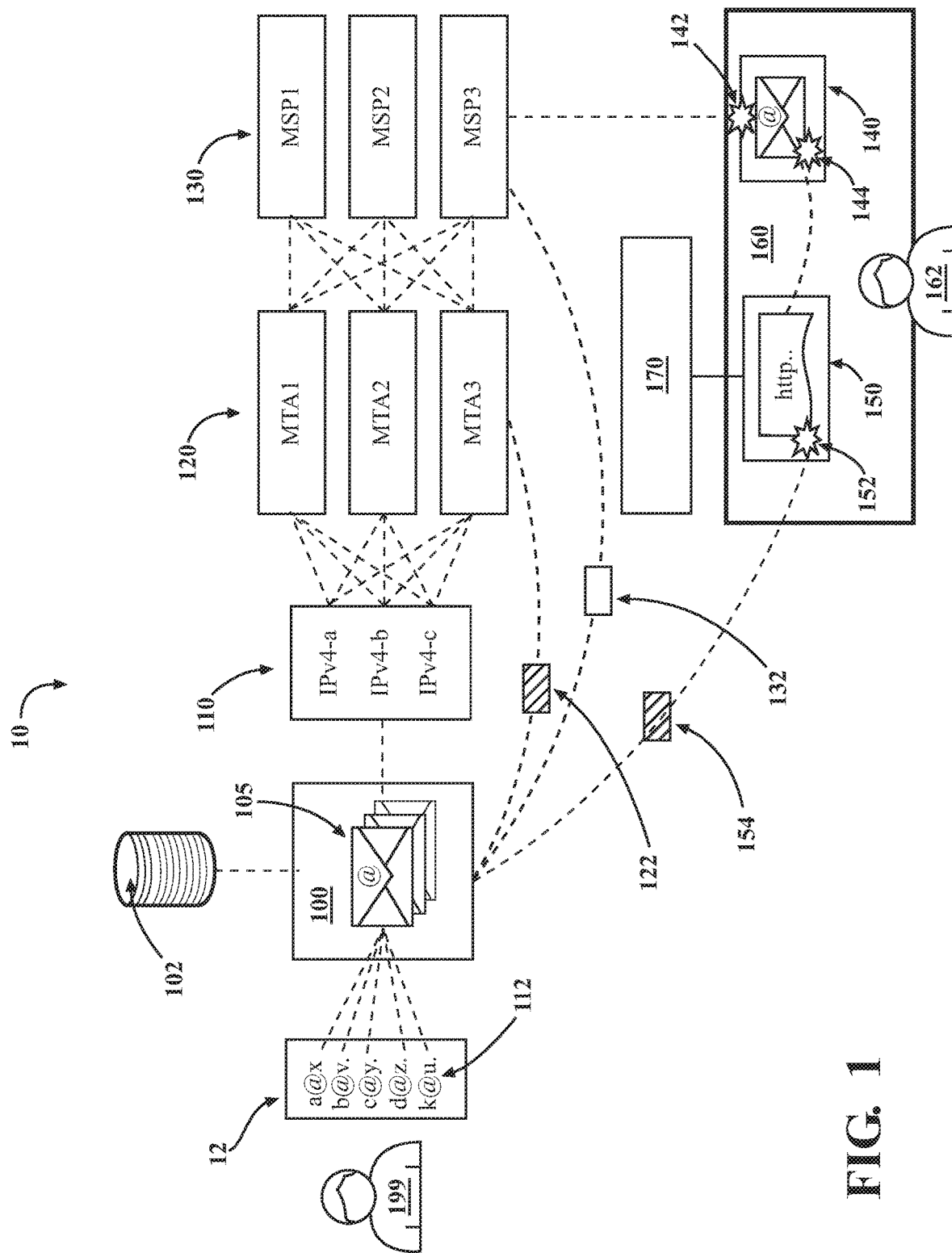
FIG. 1 illustrates an exemplary architecture and system for delivering and processing electronic mail messages to a distribution list.

As stated, current electronic message delivery systems and methods have significant drawbacks and limitations. The present disclosure resolves problems and overcomes limitations of the prior art, summarized in the exemplary preferred embodiments below and covered by the scope of the amended claims. The exemplary embodiments and illustrations are intended to convey the inventions but are not intended to be exhaustive or exclusive, as those skilled in the art will appreciate numerous equivalent or alternate implementations of the present notions upon review of this disclosure.

In embodiments, electronic message management systems, such as electronic email, text, messaging, and the like may provide benefits to email users, such as enterprises, marketers and other users who use email lists for business and other purposes, by managing email activity (e.g., for bulk email campaigns all the way down to individual emails) end-to-end from creation of the email through its life-cycle. In addition to handling basic email recipient list processing functions, an electronic message management system (referred to herein in some cases as the "platform") may handle a range of functionality related to email campaigns and the like, such as supporting receipt of emails from a range of entry points (e.g., sources of lists, email content, list management metadata, and the like), a range of interfaces that may provide email workflow data/requirements and the like (including interfaces from workflows like those involved in sales and marketing activities of an enterprise), coordinating the execution of email send calls that activate the flow of email based on the list requirements, and the like; handling email traffic through mail transfer agents (MTAs) and the like, and identifying and dealing with events in the life cycle of individual email messages (e.g., the email being sent, dropped, bounced, re-sent, received, processed, opened, forwarded, downloaded, acted upon (such as downloading an attachment or engaging with a like), responded to, deleted, marked as "spam," and the like).

In embodiments, an electronic message management system may support a range of sources of email content and recipient information (e.g., email lists and the like), in addition to native interfaces, such as an electronic user interface, and the like. In embodiments, the electronic message management system may facilitate interfacing with applications, such as word processing applications, spreadsheet applications, business management applications, sales lead applications, customer management applications, event planning applications, database management applications, and the like. Interfacing with such source applications may include receiving email content and/or email recipient information and the like, such as through an API of the electronic message management system and/or of the source application or system. Such an interface of the electronic message management system may receive email recipient information, such as email address, recipient name, alternate email address, related email addresses (e.g., other family members, business associates and the like), physical addresses, and/or other recipient electronic contact information (e.g., phone number, social media contact, Internet presence handles such as a personal website address, and the like). In embodiments, email recipient information may be provided various ways, such as individually for each recipient, as a stream of email recipient information, in bulk, as a dataset of email recipient information, and the like. In embodiments, the electronic message management system may access recipient information through an interface of one or more source applications or systems, such as by requesting information for one or more recipients, by periodically polling an API or other data source, by subscribing to a stream of information published by a data sources, by directly accessing a dataset (e.g., a file, database and the like) of recipient information, by initiating a structured or unstructured query on a database or other data source, and the like. Through such methods and systems or others, the platform may thus receive message content and recipient information for an electronic message, such as in a campaign involving the message.

In embodiments, an electronic message management system may provide entry points for a range of email campaign objectives, such as initiating a campaign, processing sales leads, following up on an existing campaign, following a workflow of a campaign and the like. In embodiments, a business process workflow, such as a new product introduction workflow, may include an email step or steps. Each email step in a business process workflow or other workflow may be supported by the electronic message management system distinctly, based on or using, for example, email activity and/or results from a prior email step in a workflow. In embodiments, a subsequent email step in a workflow may include rules that the electronic message management system may process to execute the subsequent email step, such as selecting from an email list only those recipients who have not yet met a criterion at this step of the workflow (e.g., by resending an email only to those recipients on a list who have not already responded to the email, and the like.)

In embodiments, the electronic message management system may support a plurality of different application interfaces to facilitate efficient entry of email content and/or recipient information. In embodiments, an email entry point interface of the electronic message management system may perform a series of functions that may emulate an interface of one or more source email campaign systems, such as those described herein. The electronic message management system may configure and/or execute a sequence of steps, such as by processing a script that may enable access to a source email campaign system and the like.

In embodiments, an email campaign source application may provide one or more lists of recipients that may be processed differently by the electronic message management system. In an example, an email campaign may provide lists for recipients to include, lists of recipients to exclude, lists of recipients to suppress and the like. Alternatively, a single list may be provided with metadata indicating which recipients to include, exclude, suppress, and the like, or indicating other factors or parameters that maybe processed by the platform to determine what recipients to include or not include (such as by categories, such as involving known demographic, geographic, psychographic, or other information, such as may be understood by reference to, for example, a CRM system of an enterprise for which a campaign is being executed). The electronic message management system may receive these one or more lists and store a portion of the recipient information to facilitate efficient access thereto by operations of portions of the platform. In embodiments, the electronic message management system may capture the one or more inclusion lists, remove any recipients that are identified in the exclusion list to generate an active email recipient list for an email campaign or the like.

In an example, a source email campaign application may provide distinct lists that the electronic message management system may ingest and store as a single metadata-annotated list, as individual lists, and the like. In another example, the electronic message management system may ingest and store email recipient information only for recipients on an inclusion list. In yet another example, the electronic message management system may ingest and store recipient information for included recipients and only a portion of each excluded email recipient, such as the email address and the like. These examples are not intended to be limiting so that any form of ingestion and storage of email recipient information is contemplated and included herein.

Figure 5A:
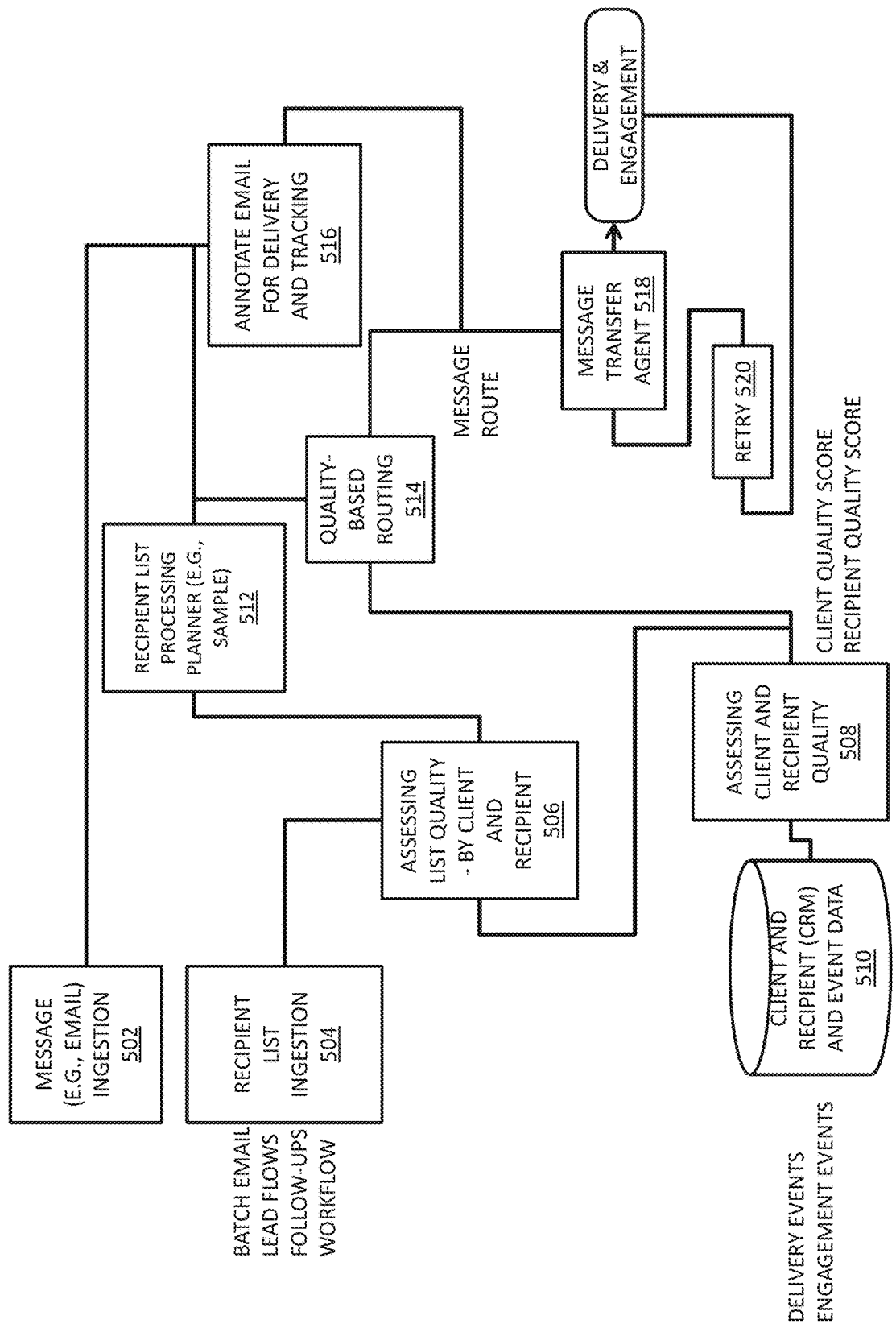
FIGS. 5A and 5B illustrate an exemplary architecture for managing message delivery and optimization.
Figure 5B:
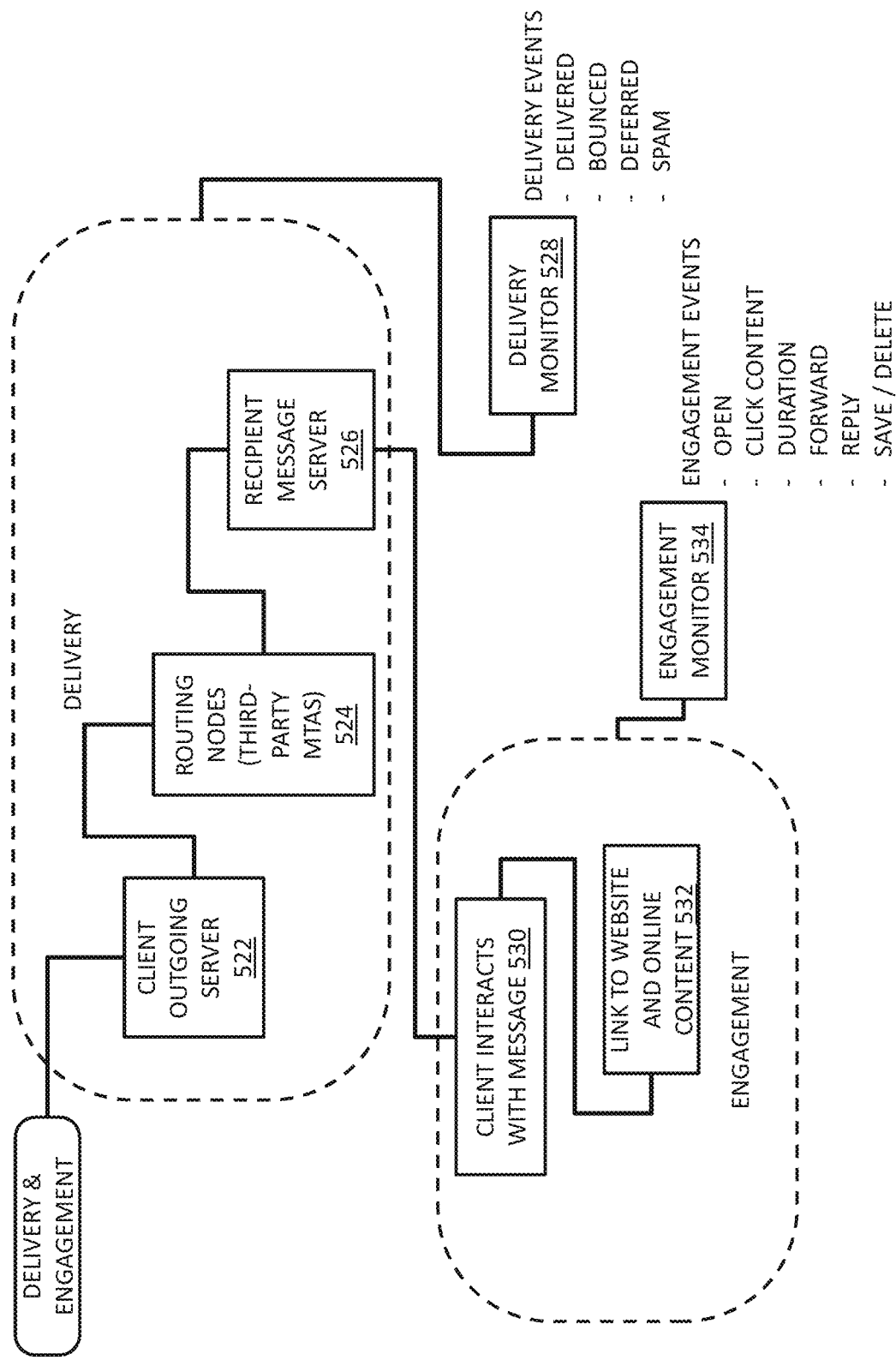

Referring to FIGS. 5A & 5B, an architecture for the methods and systems of message management described herein is depicted. FIG. 5 is depicted as a first portion FIG. 5A and a second portion FIG. 5B. FIG. 5A depicts a message ingestion processing circuit 502 and a recipient list ingestion processing circuit 504. A list quality assessing circuit 506 may assess quality of clients (e.g., senders of emails in campaigns and/or infrastructure elements used for that purpose), recipients and a combination thereof by accessing one or more client and/or recipient assessment factors provided by a sender and recipient quality scoring circuit 508 that accesses a data base of event data 510 that may include client- or sender-related event data, recipient-related event data, recipient status data and the like. Alternative embodiments (not shown), may include circuits that separately score a client/sender, a recipient, a relationship between a sender and a recipient, or a combination of any of those. The list quality assessing circuit 506 may produce data that is useful to a list processing planning circuit 512 that may determine if a recipient should be excluded, if a sample of recipients should be sent as a batch prior to processing the entire included recipient list, and the like. Each recipient may be processed with a quality-based routing circuit 514 that may identify a route, or a tranche of routes (which may be configured or selected based on one or more quality factors), and the like through which the message should be routed to the recipient. The route may include identification of one or more of a server or other network node from which a message will originate, one or more IP addresses from which messages will be sent, one or more MTAs by which a message will be transferred, one or more other intermediate network elements that may be involved in a campaign, and one or more recipient domains and recipient email addresses. The message ingested by the message ingestion circuit 502 may be annotated with an annotation circuit 516 based on, for example, recipient information, client/sender information, quality information, and the like, such as in the form of header and other metadata that may facilitate end-to-end lifecycle tracking of the message. The quality-based route for the message produced by the quality-based routing circuit 514 may be combined with the annotated message from the message annotation circuit 516 and delivered to a message transfer agent (MTA) 518 that may engage with Internet resources to perform delivery of the message. Depending on a result of delivery, a retry circuit 520 may be activated to determine a timing and count of retry attempts for a message that fails delivery, such as by virtue of being bounced by a spam filter or blacklist, being subject of a DNS message, receipt of a message indicating an invalid recipient address, or the like.

Referring to the second portion of FIG. 5, FIG. 5B continues the delivery and engagement phase of a message lifecycle that may be initiated by the MTA 518. Delivery, which may involve or produce delivery lifecycle events, may include forwarding the message to a sender's (e.g., client's) outgoing email server 522 for delivery over a route to one or more recipients. Delivery may continue through nodes, such as Internet and other network communication infrastructure nodes, third-party MTAs 524 and the like that satisfy the route identified by the quality-based routing circuit 514, with the ultimate destination preferably being the recipient's incoming message server 526. A delivery monitoring circuit 528 may detect, such as through receiving an indicator of a bounce event from a server, a SPAM report, a DNS message, or the like, various delivery status events for the message. These events may be stored in an event queue or the like in a data storage facility, such as event data storage facility 510, and the like. Lifecycle event monitoring may continue as the recipient may engage with a message 530, such as by opening the message, downloading the message, forwarding the message, replying to the message, deleting the message, tagging the message (e.g., as spam), engaging with a link in the message, downloading an attachment of the message, and the like. In embodiments, the recipient may engage with the content of the message 532 in a way that is intended by a sender or operator of an electronic message campaign, such as by selecting a link, downloading an attachment, or viewing a resource included with or referenced by the content of the message. An engagement monitor circuit 534 may detect and report engagement activity, such as opening a message, interacting with content, taking action on the message, or the like. In embodiments, the engagement monitor circuit 534 may detect a duration of engagement, a type of engagement, a location of engagement (e.g., a geolocation of a recipient's device at the time of engagement, a location of a message on a display screen, or the like), and the like.

Figure 6:
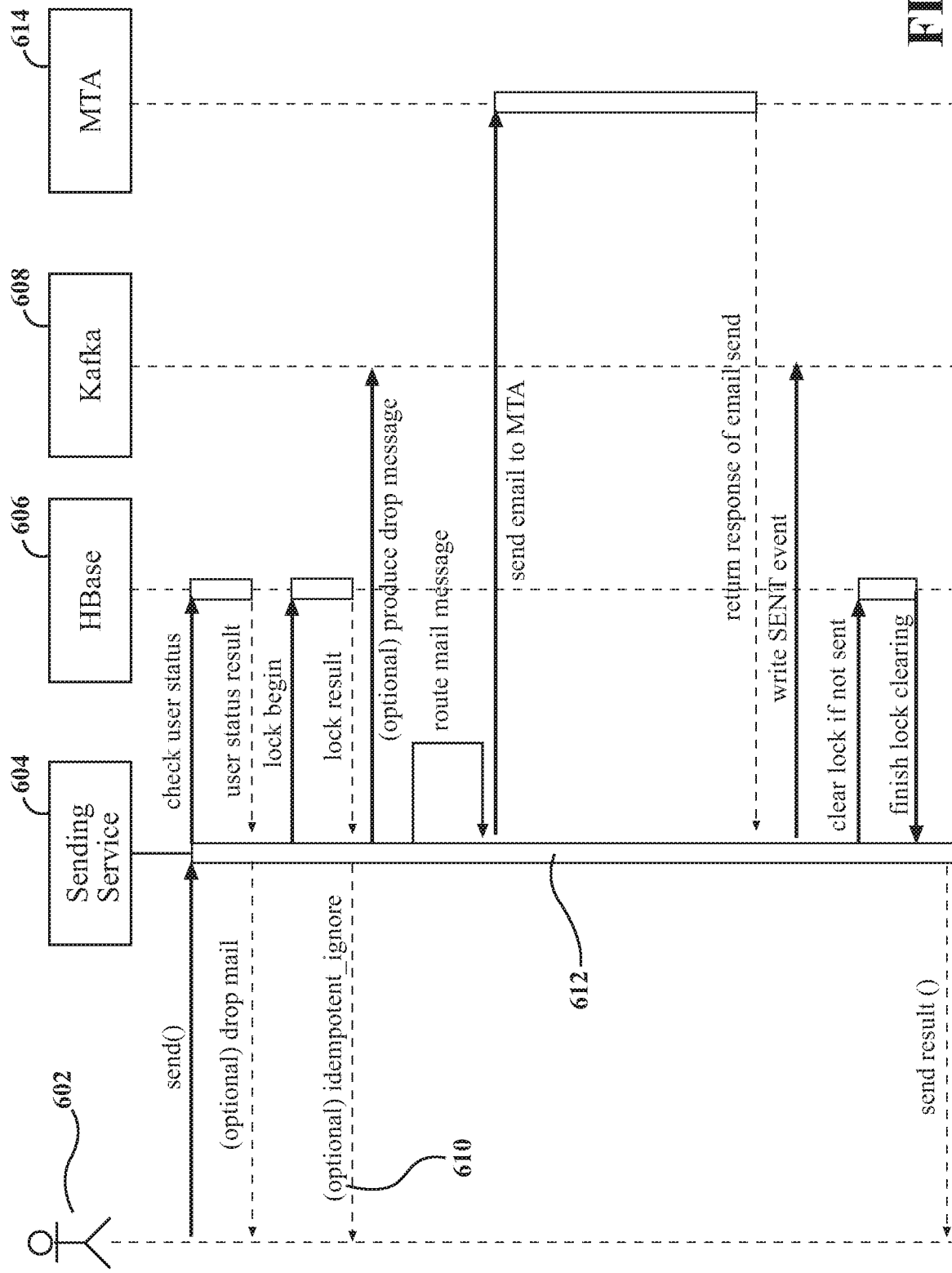
FIG. 6 illustrates an exemplary message management workflow.

Referring to FIG. 6, a send-call sequence of activity for at least one electronic message is depicted. A client 602 may request (e.g., send( ) a message campaign or the like from a sending service 604, such as the message management system described herein. The sending service 602 may check a database for user status 606, such as a scalable, distributed, big data store like Apache™ HBase™, or the like, to determine if the send( ) request is ready to process. Upon return of the status, the sending service 604 may lock the send request by updating the user status database 606. Upon confirmation of a successful lock, an initial event of the message send request may be stored in an event queue 608 (e.g., using a real time event streaming system like Apache™ Kafka™). In embodiments, upon confirmation of an unsuccessful lock, the request may be aborted by sending an ignore message 610 to the client 602. A step in processing a send( ) request may include preparing a route 612 for the message to at least one recipient, such as a recipient who is included in, for example, a list of recipients included in or referenced in the send( ) request. In embodiments, preparing a route may include applying dynamic routing techniques, quality-based routing techniques and/or other routing techniques described herein and in the documents incorporated by reference herein.

A step in sending one or more messages may include forwarding the routed message to or via a message transfer agent (MTA) 614. The message transfer agent, described in detail elsewhere herein, may facilitate routing the message according to the prepared route over the Internet and the like. The MTA 614 may also return a response and/or delivery status of the message to the sending service 604.

The returned message, delivery status and the like may be processed by the sending service 604 to prepare an event for the recipient-specific message that may be stored in the event queue 608.

Upon completion of processing the send( ) request, such as after completely processing a list of recipients associated with the send( ) request, the client status database 606 may be updated, such as by clearing one or more locks placed earlier in the message send( ) request processing flow. In embodiments, a result of the send( ) request may be delivered to the client 602 from the sending service 604 or to one or more components or services of the platform or of a user of the platform, such as an enterprise, a marketer organizing campaign, or the like.

In embodiments, an electronic message management system as described herein may, in response to ingesting one or more email recipient lists, execute a sequence of steps to implement an email campaign. In embodiments, an exemplary sequence may reference a send call sequence as depicted above. An optional first step in a send call sequence may comprise a status check for proceeding. Such a status check may include comparing email campaign send criteria with contextually relevant information, such as a campaign start date/time and the current date/time (e.g., start no earlier than Jan. 1, 2018 at 11:59 AM). Other status conditions that may be checked to start a send call sequence may include polling a start parameter of an email source application or system, such as through an API call and the like. The net effect of a condition checked by a start send-call sequence status check may be that the send call should be paused for a relative or absolute period, such as pausing for 24 hours after completing a prior start send-call sequence or pausing for two hours from receipt of an updated email list, and the like.

Another step, which may be performed at least in part in parallel with a status check, may include locking at least one entry in a recipient email list to prevent changes from occurring while the platform performing at least a portion of the remaining steps involved in sending an email to the recipients on the list. While an email list may result in overlapping network activity for several email messages, depending on a route plan for each, tracking a lifecycle of email may include tracking a lifecycle for each unique email, recipient, and the like. Therefore, for each recipient, the recipient entry in an email list or the like may be locked from a time when the email is ready to be prepared to send and a time when it has been confirmed to have been received by an email transmission node in the network, such as a mail transfer agent.

Another step, which may be performed at least in part in parallel with a status check, may include annotating an email, such as with a DNS setting of the email campaign source provider. This exemplary email annotation may facilitate sending the email so that it appears to mail transfer agents and/or mail service processors and ultimately to the recipient as if it were sourced by the email source provider. In embodiments, adjusting DNS settings in this way may provide benefits to the email source provider, while avoiding or mitigating negative impact on the reputation of one or more servers of an operator of the platform, such as a host enterprise that helps other enterprises design and execute electronic message campaigns.

Another step, which may be a sub-step of a step involving annotating the email, may include scoring the email for quality, optionally relating to one or more or a wide variety of dimensions of quality including, without limitation, an indicator of the probability of engagement of the recipient with the email and/or a resource referenced in the email, an indicator of the likelihood of a sender IP address, a sender server, a sender business entity, a sender email address, or the like being placed on a black list, banned list, blocked list, watch list, or the like, an indicator of the probability that the email will reach one or more recipients without being returned, an indicator of the probability that the email will be read, an indicator of the probability that an attachment to the email will be downloaded, an indicator of the probability that a link in the email will be followed, and the like. In embodiments, engagement may include opening the email, scrolling in the email, keeping the email in an active window of the recipient's computer (e.g., the top window, such as for a duration of time), an amount of time that the email remains open, a number of times that the email is opened, whether the user saves the email as unread, whether the user deletes the email, whether the user activates a link in the email (e.g., a URL to a web page or other resource, such as an attached file and the like), whether the user interacts with a web page at the activated link, whether the user downloads an attachment, whether the recipient replies to the email, whether the recipient forwards the email (and optionally to whom) and the like.

Another step may comprise defining or selecting a route for the email. Aspects such as email quality score, sender quality score, recipient quality score, sender-recipient relationship score (which may, in embodiments, be determined by reference to relationship information received from a CRM system), sender acceptability score, recipient responsiveness score, access to and loading of mail transfer agents, network infrastructure conditions, MTA conditions, Internet conditions, email traffic conditions, and the like may be used individually or combined in various permutations or combinations, such as by summing a number associated with each score to generate a route score for the email, generating a weighted average score based on one or more sub-scores, and the like. Email scoring and route development methods and systems described elsewhere herein may be applied without limitation to an email or sequence of emails in a send call sequence.

Another step in a send call sequence may include forwarding (e.g., routing, handing off, and the like) an email, such as an annotated email, to an MTA as described elsewhere herein. Actions that an MTA may take upon receipt of the email are also described elsewhere herein.

Another step in a send call sequence may include closing out a lock created in an earlier step. If it can be confirmed that email sent in the earlier step has reached a network node, such as an MTA, such as by receiving a reply confirming receipt from the MTA or successfully transmitting the entire message without a network-type error (e.g., failure to send, and the like), then a lock may be closed off. If the sending of the email cannot be confirmed, or if its failure to send is confirmed, then the electronic message management system may choose to resend the email. In embodiments, it may continue to do so until a resend stop criteria is met, such as the email being successfully sent, an email being successfully received, a resend timeout or count limit being reached, and the like.

In embodiments, an electronic message management system may track and record activity, such as events that occur throughout a message or campaign lifecycle. An objective of such tracking and recording may be to collect data and record an event when something happens with an email. Events may cover human interaction, network interaction, network node interaction, and the like. An email campaign may include campaign-level events and individual email-specific events. Campaign-level events may include send events, such as when a project is accepted to send, drop events, such as when an email project is not accepted to send, and the like. Send events and drop events may also be associated with a lifecycle of an individual email recipient in an accepted email list (e.g., an email campaign that has associated with it a send event). In an example, an individual email recipient in an accepted email list may be dropped (i.e., experience a drop event) if the recipient address is determined to be invalid, and the like.

In embodiments, other lifecycle events may include email processing events, which may occur for an email campaign and/or for individual email recipients based on at least one email in the accepted email list being successfully transferred to an MTA or the like. Processing events may further include actions taken by an MTA, such as having routed the email, having paused sending the email, having scheduled the email, and the like. In embodiments, processing events may further occur as email moves through a lifecycle, such as if an email is successfully delivered to the intended recipient, which may be determined by an incoming email server that handles email sent to the recipient's email address confirms receipt or at least accepts the email (e.g., does not explicitly refuse the email, as may be done when an email includes an attachment that is too large, or other incoming email server rules being violated, and the like). Other events or status conditions relating to an email may include it being deferred, bounced, engaged with, or the like, as well as having a change in status. In embodiments, a deferred processing event may be handled by the electronic message management system by at least one of receiving a deferral indication, confirming a deferral duration, specifying a deferral duration, rejecting a deferral duration, objecting to a deferral indication, and the like. In embodiments, a bounce processing event may indicate that an incoming email server determined that the email failed to meet an acceptance criteria, such as if the email content is scanned and found to include a virus or other condition. Acceptance conditions that may be applied by an incoming email server may be determined independently of an electronic message management system. However, the electronic message management system may include a processing event analysis facility that learns, such as with machine learning, what conditions are not being met and may adjust subsequent email destined for the rejecting incoming email server to avoid being rejected. In an example, if an incoming email server limits the number of emails being delivered from an IP address (e.g., an email sender) in a period of time, the electronic message management system may pause sending email to the affected incoming email server in an attempt to avoid triggering the email limit function.

In embodiments, processing events may include engagement events that may occur as a recipient interacts with an email. Engagement events may include an email being opened by a recipient, forwarded, replied to, deleted, left unread, opened but not scrolled, scrolled, tagged, read, or the like, an attachment being opened, a link being engaged with, an email experiencing a status change (e.g., deleted, saved, marked as unread after opening) and the like. Engagement events may include interactions that a recipient might have with the content of an email, such as clicking a link (e.g., a URL), downloading an attachment, replying to the sender, and the like. Further engagement in response to a recipient selecting a link or downloading an attachment in the email may be captured through a URL resource (e.g., web page and the like) activated in the link, embedded code in an application (such as tracking code), or the like.

In embodiments, tracking email activity and events may include recording activity and events associated with email content. Email content may include links to other content, such as other Internet resources (e.g., URLs and the like), tags that may be embedded in an email via tracking and activity pixels, and the like, as may be described elsewhere herein. Such tracking pixels may facilitate determining a duration of interaction, determining when an email is forwarded, determining when an email is printed, determining when a link is followed, determining when an attachment is opened, determining whether an embedded advertisement is viewed, and the like.

In embodiments, a database of links, embedded pixels and the like for each email may be maintained by the electronic message management system to facilitate end-to-end lifecycle event tracking and recording. To facilitate tracking, links in emails may be rewritten when an email is prepared to be sent to a recipient. A form of link rewriting may be based at least in part on the format of the email, such as HTML, plain text, and the like. In embodiments, links in an HTML formatted email may be rewritten to include the target URL (e.g., that may be provided by the email author) and metadata, such as metadata that may facilitate tracking, recipient identification, and the like; however, such a URL may be long and unwieldy in some instances. Alternatively, a short URL may be prepared and inserted that relies on an external URL resolution process that redirects navigation by asserting a longer URL that may include the target URL as well as electronic message management system metadata and the like. Such an external URL resolution system may further facilitate interaction and event tracking and the like. In embodiments, a plain text formatted email, which may not support embedded URLs, may benefit from use of a short URL with external resolution function as described above.

In embodiments, a list of spam sources, such as a blacklist of email providers who are identified as delivering spam, may be used to facilitate improving email delivery. As an example, if an original email sender URL has been added to a blacklist (e.g., any third-party list of suspect or spam URLs), the electronic message management system may provide a form of feedback to the original email sender regarding this finding.

In embodiments, one or more components of the system may receive and process one or more status events, such as received from one or more other components of the system (e.g., relating to interactions of users, services or processes with a subscription management system) and/or received from other sources. Status events may, in embodiments, be processed using an email list management facility, such as involving a List-Unsubscribe process, or the like.

In embodiments, status may be tracked on a recipient-by-recipient basis. In embodiments status may be tracked on a recipient-client basis that links a recipient with a message originator, also referred hereinto as a client of the message management system. In embodiments, a status for a recipient of either type (e.g., individual recipient or recipient-client) may be stored for any reasons that require not sending a message to the recipient. This may be referred herein to as excluding a recipient in a recipient list and the like. Stored status may include non-delivery type reports, bounce-type report and the like for an address of the recipient (e.g., an email address). A bounce from a recipient incoming email server (e.g., the xxx.yyy in an email address formed as recipient@xxx.yyy) may indicate that the email address does not exist. Such a status may indicate that further messages should not be sent to this recipient until an explicit confirmation is obtained from the recipient (e.g., an email is received from the recipient email address) that the address is in fact valid. A motivation for ceasing to send messages to a recipient with such a status is that sending such messages potentially compromises the integrity and reputation of the sender's domain, in turn potentially resulting in blacklisting and the like. In embodiments, multiple bounces for this type of error, where no email address exists at the recipient's domain that match the address to which an email is sent, may result in the recipient being excluded from all message send requests, independent of sender. In an example, if a recipient address receives a bounce for three different senders in a time period, such as 90 days, the recipient address may be excluded from all future requests for all current and future senders.

In embodiments, a report from the recipient that the sender's message is considered spam may result in a status stored that can prevent further messages being sent from the sender to the recipient. In this case, while the recipient email address may be valid, the explicit marking of the message as spam is a strong indicator that further messages will also be automatically marked as spam by the recipient's incoming email server. The motivations for stopping further messages from the sender to the recipient are similar to those involved in dealing with a hard bounce—namely, avoiding negatively impacting the sender's reputation. Similar to a situation involving a hard bounce, until a recipient explicitly indicates that email from the sender is no longer considered spam, messages to that recipient from that sender may be suspended within the platform to avoid or mitigate reputational damage.

In embodiments, a recipient may explicitly unsubscribe from messages from the sender. This may be an explicit reference to the sender or may be a reference to an industry or type of marketing message that the sender is associated with. In embodiments unsubscribe status events may be stored with information that uniquely identifies the sender and recipient, their respective domains, and an identifier for the specific message to which the unsubscribe was attributed.

Status events may be checked prior to transferring a message to an MTA. Status events and conditions that cause a message to be dropped, and some status events and conditions may be a basis for over-riding a message drop (e.g., an indicator that a message is not supposed to be transferred to the MTA). Status events may be prioritized in various orders and associated with resulting actions. One exemplary order of priority (from highest priority to lowest) is as follows, and the platform may perform various actions based on rules that reflect this or a similar prioritization:

a. Message content is critical, such as for an account of the recipient (e.g., password reset), such that the platform overrides any exclusion status so that the message is not dropped;

b. Recipient status of hard bounce causes the message to be dropped;

c. Message that is transactional and prompted by a direct response of the recipient overrides any exclusion status so that the message is not dropped;

d. Recipient status of unsubscribe from the sender causes the message to be dropped; and e. Recipient status of unsubscribe from a marketing type or industry type causes the message to be dropped.

Referring to FIG. 1, a representation of an embodiment of a system and method 10 for carrying out electronic communication is provided, such as for execution of email campaigns or bulk distribution of electronic messages, such as "email". The system and method 10 provide an end-to-end model for preparing a bulk message distribution list and processing the same over a plurality of available communication channels according to accepted electronic communication protocols. Additionally, the present system and method 10 provide for embedded tags, tokens, scripts or other data objects into electronic messages and/or web pages so as to monitor a result of the delivery of said messages. In an aspect, the electronic messages are enabled with small data objects or pixels that trigger a confirmation signal upon activation. In another aspect, the system and method 10 determine whether a recipient of an electronic message interacted with the message, and further, whether the recipient responded to a content of said message by visiting a referenced web page. As a result, the system and method 10 can develop useful correlations between electronic message content, bulk email and individual email list, and web page visit results. Those skilled in the art will appreciate the many commercial and technological advantages of such a capability as it pertains to sales, marketing, customer satisfaction, product development and public policy generally. A sender 199 sending messages based on a found or acquired list of recipient addresses 112 can be an indication that the messages to be sent are unsolicited or unwanted junk email, electronic "spam" that can result in negative feedback from recipients and mail processing agents, which could in turn adversely affect the online reputation of a sender, sender's network address, sender's email provider and others. It is not necessary that bulk outgoing emails with substantially similar content constitute spam or are undesirable. However, those responsible for processing of mass quantities of electronic network traffic have determined certain criteria to indicate "spammy" or undesired traffic. Each party associated with such traffic, perhaps other than the actual sender, generally considers it detrimental to their interests to process and handle spammy or junk like email traffic. Sufficiently degraded reputations could result in reduced or entirely blocked address space that can reduce or eliminate email delivery for the sender and others using those degraded address blocks. It is desired to send the highest quality bulk email as possible so as to improve the ranking or reputation of the sender and his or her email processing vendors. Established and proprietary internet protocols are in place for routing and processing message traffic and for allocating physical and virtual address blocks and signal pathways for carrying such traffic. As an example, IPv4 represents the so-called fourth revision of the internet protocol (IP) and is a common protocol considered in the present context. IPv4 only allocates a finite number of network address blocks, and so their relative reputation is important to the owners of the address blocks. Historical usage of the address blocks 110 determines the relative reputations of the blocks, which reputations can be of significant value to the owner and operator of said address blocks. Compromising the reputation of an address block, e.g., by allowing junk mail or spam or other electronic contraband to flow from the block could have long lasting negative effects on that block and the parties associated with it and is to be avoided. Other protocols or future versions of the IP protocol are also contemplated by this disclosure where IPv4 is used as an example.

A mail processing server 100 is connected to other components internal or external to the system by way of a data communication network, e.g., the Internet, cellular data networks, local or wide area networks, wired and/or wireless network links or a combination of any of the foregoing. In an example, server 100 is coupled by a network interface card, modem or similar communications unit to the internet, which connection may take place over one or several stages as understood by those skilled in the art. The mail processing server 100 may also comprise or be coupled, locally or remotely, to a data store, database or similar memory device 102. Server 100 may read data from or write data to data store 102 as needed. Such data can include data representing prior results from batch delivery of mail messages as well as instructions or codes representing rules for accepting, processing and delivering electronic mail messages.

A sender 199 is a party who intends to send a plurality of electronic mail messages (e.g., emails) to a corresponding plurality of addressees or intended recipients (e.g., recipient 162). For example, sender 199 may be a business owner or marketing officer of a company that sells services or widgets. The company may wish to distribute a solicitation or offer to a target audience by way of electronic mail messages to the target audience. Each individual recipient 162 would typically be identified by a unique electronic mail address. Routing protocols and address space may be determined as known in the art, so that an email message sent to recipient 162 is packaged, processed and delivered over one or more stages from its point of origin to its destination. A distribution list 12 is a compendium of several, many or a vast number of such addresses 112 for a corresponding audience of recipients.

The mail processing server 100 takes the distribution or mailing list 12 generated by or uploaded by sender 199 with the goal being to create an outgoing electronic message for each address 112 in the list 12. For each address 112, server 100 may create an outgoing electronic mail message 105, using a template for generation of the outgoing message 105. The outgoing messages 105 may be substantially identical, or they may have variations depending on the template and mail message processing scheme in use. As we will see below, the mail processing server 100 does not necessarily take each and all addresses 112 in list 12 for automatic generation of a message for delivery on its face. Instead, an intelligent and methodical processing scheme executed and coordinated by server 100, as described herein, allows for more robust and effective generation and sending of bulk electronic mail message traffic.

In some embodiments, server 100 analyzes the mailing list 12 based on its contents and assigns one or more quantitative measures of quality to the list 12. The mailing list 12 may be graded on a Pass/Fail or a binary scale as to its acceptability for processing. In other embodiments, list 12 may be assigned a quantitative measure of quality, other than a binary value, based on one or more metrics for determining said quality of the list.

In a generalized aspect, the system 10, especially server 100, act to avoid sending mass mailings that are deemed to result in low recipient engagement rates, deemed to be a nuisance or spam, or otherwise fail some quality control or business objective test. This may be done by comparing the list 12 with another known list stored in the server's data store 102. As an example, server 100 can compare a list 12, as a whole, to a previously known or stored list in data store 102. The server 100 can include list comparison software, engines, modules or instructions to achieve said comparison. In an embodiment, the server 100 can determine whether sender 199's list 12 is identical to a stored list (or data corresponding thereto) on data store 102. In another embodiment, the server 100 can determine if list 12 is sufficiently similar to a list known to server 100 and/or stored in data store 102. For example, the comparison can reveal a certain minimum fraction or percentage overlap between list 12 and the data stored on data store 102. In yet another example, the list 12 may include or be a permutation or re-formatted version or subset of the stored list in data store 102.

One aspect of the present invention is that server 100 may store or be made aware of one or more undesirable mailing lists kept in data store 102. Such undesirable lists may be designated, pre-programmed, or determined in real time to be objectionable or of failing quality metrics, including as a qualitative label or as a quantitative metric of list badness. Stated another way, a list 12 that is determined to have low likelihood of engagement. The basis for assigning such undesirability labels or metrics to a list abound. In an instance a list can be deemed unfit for use because it has been found to contain a number of invalid addresses. In another instance the list may fail to qualify because it matches or is similar enough to known spammer mailing lists. In still another instance a list may be rejected if it is the same as or similar to known "bought" lists, e.g., lists that are known to server 100 to be compilations of addresses traded in bulk among spammers or low-quality senders. Any one or more such criteria, or criteria defined by a system operator as appreciated by those skilled in the art can be used to qualify, disqualify or filter a list 12. If a list 12 attempted to be processed by sender 199 is the same as or sufficiently similar to a known undesired list(s) then server 100 may take action to reject or ignore the attempt to mail outgoing messages to the addresses in list 12.

In an example, the operator of server 100 or the email sending service may refuse the list 12 or take some other action to prevent or reduce negative consequences of sending out emails based on purchased lists. List homogeneity (closeness to a historically known list) may be a factor in ranking or ranking or evaluating a list 12. A warning or notice may be sent to sender 199 indicating that list 12 did not meet a required criterion for sending or did meet a criterion for rejection. As will be seen further, analysis and quality assessment of outgoing message traffic can be performed on a list-basis and/or individual message basis, e.g., on a sender-recipient pair basis.

Server 100, or other servers and databases available to system and method 10 may house historical data regarding senders, recipients, IP addresses and email providers, for example in data store 102, but those skilled in the art may appreciate that another data store, local or remote, accessible by server 100 can be used for this purpose. The historical data can be used to predict or rank lists and sender-recipient pairs. In an example, a percentage of bounced messages (returned for technical failure to deliver, e.g., outdated or non-existent addressee) is stored so as to act on this information at a later date if the same addressee or sender-recipient pair is encountered. In another example, an address can be vetted by server 100 and checked for conformity with an obvious protocol or standard, e.g., that it is sent to a valid domain or conforms with a syntax required by the protocol. In yet another example, the historical data can include a record of opt-outs, suppressions, abuse or "thumbs-down" complaints from recipients, advising that the electronic messages received were unacceptable to the recipients, spam, or otherwise of poor content. If a list 12 is found to include greater than a threshold amount of such objectionable addresses or indicia, the server 100 can refuse to send the list or alert its sender that the list contains a large number of historically known unwelcome sender-recipient pairings. The historical data is gathered in practice by mail service providers (MSPs), mail transfer agents (MTAs) and sender service providers, which may share such data with one another or publish it for the message traffic community to benefit from. This practice is inconsistent among providers. In addition to the infrastructure described, other ancillary and support services abound. For example, mail protector services exist and can apply proprietary or standardized tests to rank and filter message traffic. Most major email services employ an in-house or a custom mail protection service, which is responsible for maintaining sophisticated up-to-date methods for detecting and preventing the passage of spam to the respective customers, including using large proprietary spam traps and other techniques.

In most cases, list 12 and the majority of addresses 112 in list 12 may be of an appropriate form and qualify for processing and delivery. Outgoing messages 105 are routed over one or more data pipelines having assigned address blocks 110, according to the address block allocation available to the sender's email service and as permitted under IPv4 (or equivalent and similar protocols).

In some aspects, the system and method 10 improve or optimize the routing of outgoing messages 105 from mail processing server 100 according to the present invention. The server 100 may choose a suitable block (or sub-block) of IP addresses to use for sending out a group of email messages in a list 12. The IP address block 110 chosen may be based on a quality measure of the entire list 12 as a whole. Alternatively, individual email messages 105 can be routed over chosen IP address blocks 110, depending on a quality measure of each individual email message or addressee. This concept may be termed quality-based routing (QBR) and is one aspect of the present system and method 10. In an embodiment, higher quality mailing lists and message traffic are sent over commensurately higher quality or value address blocks allocated to the sender's service provider. Conversely, lower quality mailing lists and message traffic are sent over commensurately lower quality or value address blocks. Since message traffic infrastructure may identify and associate messages and addresses with one another by virtue of other messages they are associated with, one goal of QBR is to prevent or minimize the unintended and unwanted penalty which could attach to a higher quality mailing by virtue of its association with lower quality message traffic. IP protocol determines the physical pathways used to route each message 105 over the extended inter-connected network of the internet to one or more mail transfer agents (MTAs) 120.

In addition to the foregoing notions, the mail processing server 100 can determine which MTA 120 a certain message 105 is to be routed to. The MTAs 120 implement a set of filtering, routing and ranking rules that can affect the flow of bulk traffic and that can significantly affect the reputation of a sender and/or network address blocks used by the sender. The MTA criteria for ranking and processing messages is not always public and can involve complex or proprietary algorithms for measuring the quality of a batch of message traffic. MTAs 120 may further provide routing confirmation signals 122 back to the sending service or mail processing server 100, such as indicating a status or metric that has been assigned to an outgoing message 105. For example, routing confirmation signal 122 may indicate whether a given message 105 was forwarded or blocked or graded on some criterion by the MTA. MTAs 120 generally pass outgoing electronic messages 105, over yet more portions of the network, to a plurality of respective mail service providers (MSPs) 130 based on which provider handles the account of a given recipient 162, which is in turn based on the address 112 included for the recipient 162 in the given corresponding message 105.

In embodiments the MSPs 130 receive messages 105 from the MTAs 120 and deliver individual email messages to their respective recipients or addressees 162 according to a method chosen by the particular MSP. Some MSPs 130 can provide feedback or confirmation messages 132 to the message processing server 100 indicating a state of delivery of a given message, any error code or other data associated with a message by the MSP. If a message is not blocked on its way to recipient 162, the message should arrive in a mailbox of the recipient 162. Email inboxes are commonly used by subscribers to email services (e.g., Gmail, Yahoo, or other corporate or institutional email systems). Recipient 162 commonly uses a mail reader or client application 140 running in a user or client environment 160 such as a personal computer or mobile device that can receive email message traffic and present the same to its user. MSP 130 can determine if a delivered message 140 was opened by its recipient 162 and may also determine based on encoded contents of message 140 the duration that the message was opened for or other facts concerning the interaction between recipient 162 and delivered message 140. Delivered message 140 in this context may be identical to or a formatted version of the sent message 105 mentioned above.

According to some aspects of this disclosure, a received electronic mail message can contain a unique embedded message tag 142, which may take on a variety of forms. In general, the unique embedded message tag 142 is prepared at the time of preparing outgoing message 105 and is carried over the delivery chain to its destination, and contains or encodes information that is activated by the opening of message 140. Tag 142 can be an embedded script, code, or special pixel of data that is activated by opening message 140 and enables mail processing server 100 to determine that said message 140 was in fact opened by its recipient 162. In addition, according to some embodiments, the server 100 can determine how long a recipient engaged with a received email message 140, e.g., by measuring how long the recipient keeps an open request for a resource open. In general, systems may correlate the duration of an interaction with a quality or engagement. Accordingly, engagement metrics may be based on at least the duration of interaction (e.g., opening, waiting) between a user and an email message or content.

Electronic message 140 may further contain an embedded page link 144 that directs a user 162 to a page such as a web page identified by a uniform resource locator (URL) associated with the embedded page link 144. For instance, if the link 144 is activated by recipient 162 (e.g., by clicking on the link), a client application such as a web browser would be directed to and open the corresponding page 150. In an example, a delivered email message 140 containing a promotion, advertisement, or other content includes the aforementioned embedded message tag 142 that is activated upon interaction with recipient 162. Then, the recipient 162 chooses to click on or responds to an embedded page link 144 in email message 140. This takes recipient 162 to the corresponding web site or other URL-identified page 150 in an appropriate application on the user's computing environment 160. In an aspect, the system and method can correlate a recipient of an email message with a visitor to a website.

Furthermore, the page 150 may contain an embedded page tag 152, which indicates that the user has indeed visited and opened the identified page 150. A page activation signal 154 is returned to the message processing server 100 informing the server that not only has recipient 162 interacted with the message 105-140, but has also interacted with the page 150. This allows server 100 to determine an effectiveness of engagement of a given messaging campaign by sender 199. Sender 199 can be informed of the results of his or her campaign with regard to each individual recipient 162, or in the aggregate with regard to the whole list 12 of recipients of the messaging campaign.

The concept of quality based routing (QBR) referred to herein can be implemented in numerous ways, of which this disclosure illustrates several. Those skilled in the art will appreciate upon review of this disclosure how to modify, adapt or optimize the present notions for a given application at hand.

In embodiments, an electronic message management system may configure routes for sending messages, such as emails, based on one or more quality metrics associated with aspects of the message, a messaging campaign, such as sender information, recipient information, sender and recipient relationship, network factors and the like. Configuring routes for sending messages may include identifying sets of sender IP addresses to be used, sets of sender email addresses to be used, network infrastructure resources (e.g., servers or other infrastructure of an enterprise or of a host of the platform), MTAs to be included in a route, Internet Service Providers to be included in a route, recipient domains and infrastructure elements to be included in a route, recipient email addresses, the like. In embodiments, routing may be based on the above quality metrics and other described throughout this disclosure or as understood by those of ordinary skill in the art. Determining a route for a message, such as an email, and therefore at least a portion of the resources and infrastructure between and through which the message may be routed, may be performed by applying the quality metrics, such as used within or under control of an algorithm that favors sending messages with high quality metrics through selected routes and sending messages with lower quality metrics through different routes. Resources or elements to be included in planning a route for a message may be selected based on a range of factors including cost of routing, performance, reputation, and the like. In general, for messages that have a high-quality metric, a route preparation algorithm may select resources (e.g., ISPs, MTA, servers, and the like) that are lower in cost, higher in performance, and maintain a reputation as providing higher quality message traffic. Aligning message-related quality with the quality of resources used in a campaign may provide other benefits, such as improved reputation for the originator of the message, the recipient, and the like. In embodiments, a quality measure of a relationship between a message originator and a message recipient may also impact message-related quality.

Figure 7:
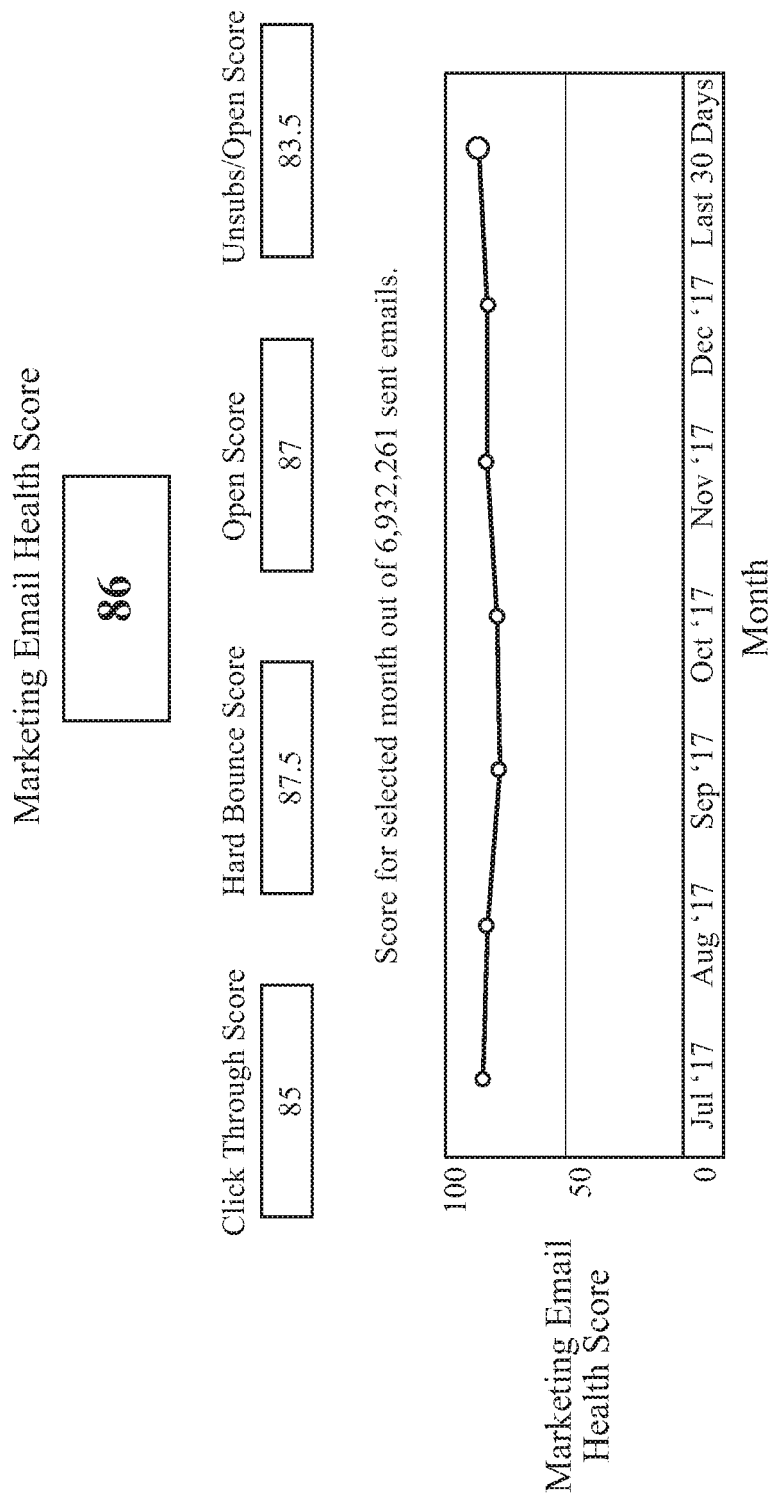
FIG. 7 illustrates an exemplary composite relationship score.

In embodiments, a relationship quality measure for a message originator and a message recipient may be based on analysis of data captured by the message management system while managing a messaging campaign, data captured from past campaigns, and the like. In an example, if messages sent by an originator are opened, and interacted with by a particular recipient, a measure of the originator to the particular recipient may indicate that the relationship is a higher quality relationship. In another example, if a message originator domain and a recipient domain exchange messages through the message management system without substantive rejects, bounces, and the like, a relationship between an originator and a recipient may be ranked as high. In embodiments, a relationship score may be computed from a weighted average or other aggregate measure over a period of time (e.g., a month and the like) of ratios, such as, in embodiments, one involving calculation and/or aggregation of one or more of four ratios or fractions: (i) the fraction of messages that receive a click by the recipient (an engagement type event), (ii) the fraction of message send attempts that resulted in a hard bounce (a delivery type event), (iii) the fraction of messages that are opened by the recipient (an engagement type event), and (iv) the fraction of message opens that result in a recipient unsubscribing (e.g., opting out of future messages from a sender). Such a composite score, that may represent a "marketing health" for a sender or client is depicted in FIG. 7.

In embodiments, when message-related quality metrics as described herein suggest that a message may be of lower quality, a route for the message may be accordingly configured, such as with resources (e.g., sending servers, MTAs, sending IP addresses, Internet providers, or the like) with comparable or appropriate quality, or at least resources other than those select for messages with high quality metrics. Thus, a message management system may act based on message-related quality metrics to place messages in one or more tranches, such as quality-based tranches, such as based on one or more of the quality measures noted throughout this disclosure. In an example, if a message quality metric is low, such as when an originator and recipient have a low relationship metric and a recipient has a low interaction/response rating (as may be measured, for example, by a count of messages sent to the recipient since the last time the recipient interacted with a message), the message from the originator to the recipient may be suppressed or essentially not sent (e.g., resulting in a drop event and the like), or it may be assigned to a resource for a lower quality traffic, such as a sender IP address that has not already established a valuable reputation.

In embodiments, message routes may be organized so that messages with similar quality are routed over similar routes, thereby establishing route quality bands/tranches.

In embodiments, message-related quality may also impact message activity throttling, such as during ramp-up of a campaign or during a campaign. Higher message-related quality may suggest lower overhead and improvements in network efficiency; therefore, a faster rate (and perhaps greater range) of message distribution may be applied to higher quality message campaigns than lower quality message campaigns. However, ramp-up may be based on individual message related quality as well, such as originator-recipient relationship quality, so that different ramp-up rates may be applied to different recipient groups in a specific message recipient list. In embodiments, message quality may be used to govern the ramp-up of a new set of sender IP addresses, a new sender domain or other resource used for routing. For example, higher quality messages may be routed using new resources during a ramp-up period, so that the new resources establish a favorable reputation and avoid being blacklisted, marked as suspicious, or the like during a period in which they have not had time to establish a favorable reputation with one or more recipient domains and/or one or more of the systems used to block or mitigate unwanted email traffic. The platform may execute one or more rules or configuration parameters to govern the duration of ramp-up of a resource, such that after the ramp-up period, the resources is treated like other resources used by the platform, such as playing a role in routing (including dynamic and quality-based routing as described throughout this disclosure).

In embodiments, a quality score, such as a message-related quality metric and the like may be computed from information available about the recipient. Information about a recipient that may impact message-related quality may include a count of tracked messages that the recipient has opened over time; a count of embedded URL clicks; a source of the recipient contact information (optionally including information from a CRM system used by the operator or designer of a campaign, in which information about the relationship with a recipient may be stored and from which the information may be obtained by the platform to be used to determine in part one or more quality metrics); metrics derived from end-to-end lifecycle events; status events as described throughout this disclosure; time since the recipient last opened a tracked message; recipient domain information; and other tracked events and the like. In an example, higher counts of opens and clicks may generally suggest a higher quality recipient and/or a higher quality relationship between a sender and a recipient. In another example, a shorter time since a recipient last opened an email or interacted with a link in the email may suggest a higher quality recipient. In yet another example, a source of recipient information, perhaps beyond the provider of a message distribution list, may impact a message-related quality metric. In this example, if a recipient contact information source cannot be validated, a quality score for the recipient may negatively impact a message-related quality metric for a message destined for the recipient.

In embodiments, an algorithm for computing a quality score may include logistic regression to estimate a probability that a message send to a recipient will result in the recipient opening the message (i.e., a message open engagement event). In embodiments, the algorithm may exclude open events that result in the recipient opting out (e.g., unsubscribing) from the message, sender, industry, or marketing message type, and the like. An overall probability estimation may be made, in this example, by use of logistic regression trained per recipient originating source (i.e., the source from which a recipient contact that was stored in the status database originally got created). In an illustrative example, the algorithm may optimize eight parameters β in the following formula for each of five contact sources:

$$P(\text{open}) = \frac{1}{1+e^{-t}},$$

where $$t = \begin{cases} \beta_{1,1} + \sum_{i=1}^{7} \beta_{1,i} C_i, \text{ where source} = 1, \\ \beta_{2,1} + \sum_{i=1}^{7} \beta_{2,i} C_i, \text{ where source} = 2, \\ \beta_{3,1} + \sum_{i=1}^{7} \beta_{1,i} C_i, \text{ where source} = 3, \\ \vdots \end{cases}$$

Here the C parameters are derived from a recipient record during a send as follows:
  a. The logarithm of the number of days since last engagement with this sender (no engagement=10 years);
  b. The logarithm of the number of messages this sender has delivered to this recipient;
  c. The logarithm of the number of times a message delivered to this recipient has been opened;
  d. Whether the recipient domain looks like a typo of a popular email domain. (E.g. gmali.com);
  e. Whether or not the recipient address is a "role" address. (admin@, info@, noc@, abuse@, etc.); and
  f. The ratio of messages this sender has sent to this recipient address which have resulted in an open.

The models may then be trained for each of the following illustrative sources, with other sources optionally being trained in a default model:
  a. CSV Import
  b. Form fill out
  c. Integration d. API Call e. Batch update In embodiments an objective of this model may be to reduce the root-mean squared error (RMSE) of the predicted probability with the measured result (one being an open event and zero being a "no open" event). For example, a retroactive prediction of the probability of an open is 0.234 and the recipient does not open that email within a constant time interval, therefore the squared error is $(0.234-0)^2$ or 0.0547. While the RMSE metric may not perform as robustly for biased classification problems, it may perform well for a regression problem here due to use of the distance of the predicted result from the measured result to help rank email send quality.

In embodiments, a customer relationship management system or the like may capture, manage and maintain recipient contact information. Additionally, such a CRM may generate and/or provide information, such as a recipient contact information quality score for each recipient.

In embodiments, message-related quality may be based on a probability of engagement by the recipient in a message. Methods that may be applied to determine a probably of engagement may include logistic regression, beta distribution, machine learning and the like. Determining a probability of engagement with beta distribution may include generating a rating based on factors described herein such as count of message opens, message content clicks, time since last open or click, and the like but additionally considering a volume of emails sent to the recipient. This technique may be visualized as a two-dimensional graph with count of messages on a first axis and probably of engagement on a second axis so that over time as count of messages increases, a probability of engagement may settle into one of a plurality of probability bands.

In embodiments, quality-based routing may facilitate reducing the chance that a high-quality email gets rejected due to IP reputation. A potential downside to this is that there can be a self-fulfilling prophecy; namely, sender-recipient qualities that are determined to be low scoring in advance are less likely to cause engagement in part because they are routed through lower quality routing resources, which will then cause their future quality calculations to be low as well.

To combat this self-fulfilling effect, a stochastic model may be used where, in addition to calculating the probability that an email will be opened, a beta distribution is created to sample for every message send. In embodiments, the probability that a message will result in an open may be treated as an unbiased estimator, so, given a probability P, a beta distribution may be constructed the mean of which is the same probability P. Working backwards:

$$P = \frac{\alpha}{\alpha + \beta}, \alpha + \beta = kN \Rightarrow$$

$$P = \frac{kN - \beta}{kN} \Rightarrow \beta = kN(1 - P), \alpha = kNP$$

Where N is the number of sends that the sender has sent to the particular recipient and k is a sensitivity parameter. With the beta distribution, the effective probability may be sampled from this distribution on every send. When the number of sends to a recipient is small, a calculated open probability may be less accurate. To adjust for this, the system may spread out the resource (e.g., sender IP address) tranche from which the recipient will receive messages. As the size of engagement history with the recipient increases, the probability estimate, and therefore the distribution may be tighter.

Figure 8:
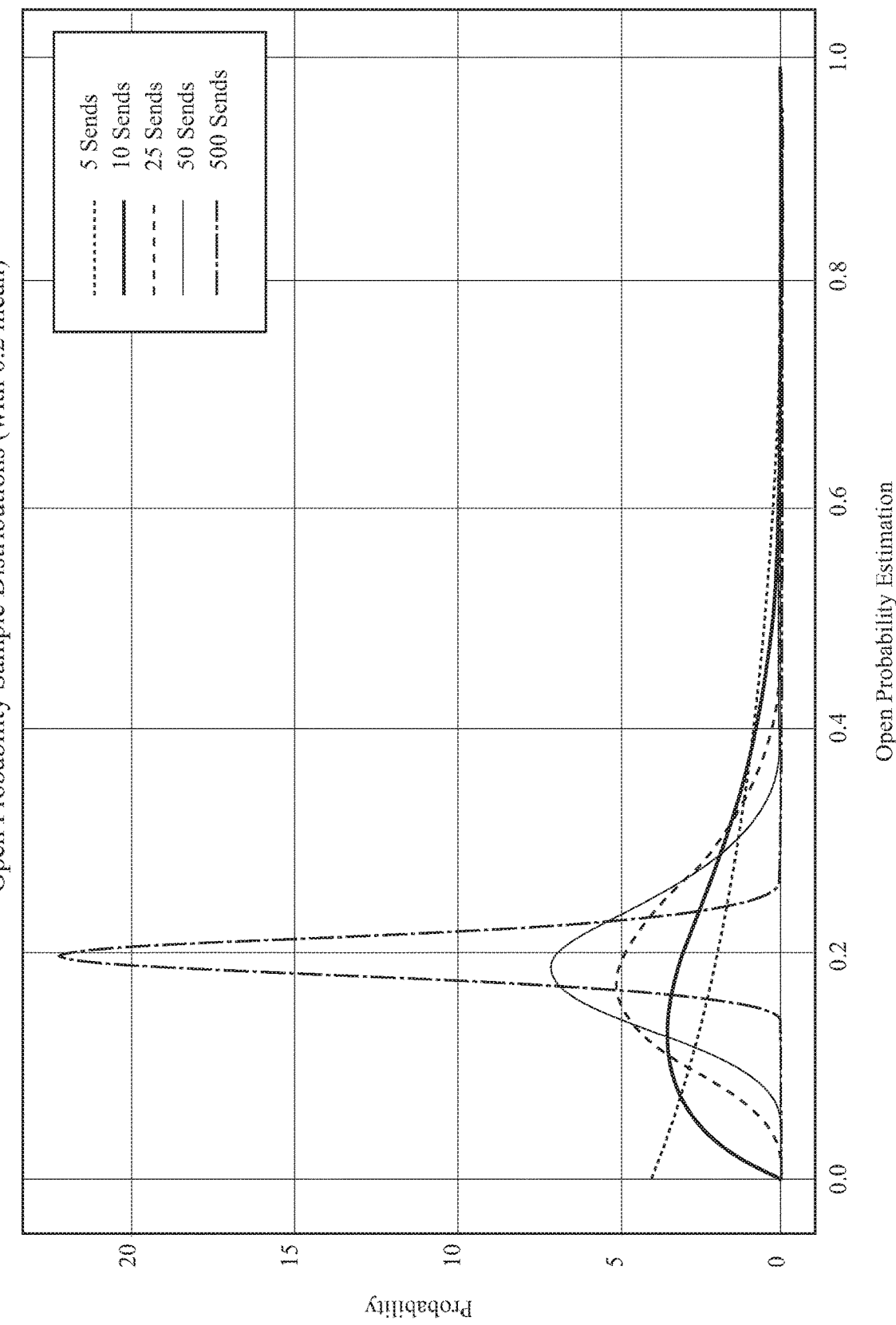
FIG. 8 illustrates an exemplary probability estimation distribution.

FIG. 8 depicts an exemplary open probability sample distribution.

In embodiments, a quality score, such as a message-related quality metric, may be used to manage and improve operational aspects of a message management system, and to predict probability of engagement for each recipient or some other measure of success. This may be accomplished by computing engagement percentiles across all recipients over time. Probabilities of engagement may be projected onto these engagement percentiles. Calculated percentiles may be used to organize message routing into probability-based routing bands, such as, in embodiments, by transforming probabilities of engagement into engagement percentiles (e.g., equally discriminating cutoffs for each band). In embodiments, a quality score may be computed into percentiles for traffic broken down by recipient originating source. These percentiles may then be used to decide which tranche of resources (e.g., a set of available IP resources) out of which to send traffic. These bands or tranches may be adjusted over time to achieve a desired or predictable degree of volume for each band or tranche. Other factors such as time of day, routes and the like may contribute to the distribution of engagement probabilities or other metrics of success. In embodiments, distribution across probability-based routing bands may be leveled by taking into consideration factors such as content of email, time of day, subject line, and the like.

In one aspect of the present disclosure, a sender-receiver pair is quality scored on a percentile scale (e.g., relative to a universe of other sender-receiver scores). In another aspect, the quality scoring is based on an expectation of a recipient engagement, which roughly means the recipient's interest in or likely positive response to the message received. The higher the interest by the recipient, the more likely the recipient is to engage in the campaign or goal of the message. Quantitative metrics can be used to describe user engagement. The unique embedded tag 142 described herein can indicate the following types of engagement, among others: (1) opening of the message, meaning the recipient receives the electronic message and clicks on it or otherwise selects it for review, reading, viewing or the like. An example is the opening of a received email message using a mail client program; (2) duration of interaction, which is a measure of the length of time that a recipient is interacting with or reviewing a message. If the recipient is not interested in a message it is likely that the message would only remain open for a brief time, e.g., seconds, while a more interested recipient could spend several minutes reading the content of an email of interest; (3) embedded link interaction, or selecting, opening, clicking on and following a link in the electronic message. As described above, an embedded page link, such as a URL to a web page, can be included in the electronic message. An interested reader might be motivated to follow a suggested link, for example to a product page or other such link; (4) replying to the message, meaning the recipient of the incoming electronic message not only reviews its content but decides to engage with the sender by responding to the electronic message. More than one type of engagement such as those given above may be used in combination to evaluate the success of or the quality of engagement. Weighting factors can be assigned to each type of measured engagement metric. In an embodiment, the weighting factors can be allocated in ascending order as above, viz.: Opening-Duration-Link Follow-Reply. In another embodiment, the measure of engagement can be a binary value, meaning either the recipient did engage or did not engage (according to any of the above types of engagements, or others).

A sender's service providers may monitor such engagement results and judge or rank the sender by the engagement results of a mailing campaign or transaction, perhaps integrated over an observation period. The lower the engagement scores or results, the more likely the sender is using the service to send unwanted spammy messages. Since this can degrade the message delivery ecosystem as discussed earlier, the sender who routinely sends a large number of low-quality messages may be downgraded to using lesser quality resources (e.g., lesser quality IP address blocks, servers, or domains) or prevented from using the services altogether. Since the higher quality resources (e.g., IP address blocks, domains or servers) may be accorded a greater status, reputation or quality score (and may be in some cases given greater bandwidth allocation by the traffic processing infrastructure), the sender may seek to optimize the quality rating and engagement rate of his or her mailing lists 12 and messages 105. Stated another way, the sender and/or message processing server may seek to maximize the number of engagements (or engagement rating) per total number of messages sent.

One way to evaluate or score a message sending transaction is to track the sent-since-last-engagement (SSLE) metric. In one example the SSLE metric is count-based and counts the number of electronic messages sent from a sender to a recipient since the recipient's last known engagement. In another example, the SSLE metric is time-based and tracks the time since the recipient last engaged with sent email from the sender. In yet another example, the SSLE may be based on a combination of counts and time since last successful engagement.

Accordingly, the sender may be forced to or may optionally be advised in certain circumstances to deliberately abstain from mailing out the maximum number of messages to the largest available mailing list 12 available. This can seem counter-intuitive to a sender who is trying to obtain the largest number of engagements and thus believes that the greatest result is obtained by sending out the largest number of messages to his or her contacts. However, in view of the potential decreases blocking IP addresses or bandwidth restrictions for senders with negative reputations, the detrimental effect of sending a large number of unwanted messages on the sender's online reputation can outweigh any benefit of adding low-yield recipient addresses in an address list. Therefore, an optimization can be achieved by sending to a reasonably large audience of recipients without causing an unacceptable rejection or disapproval rate therefrom.

Figure 3:
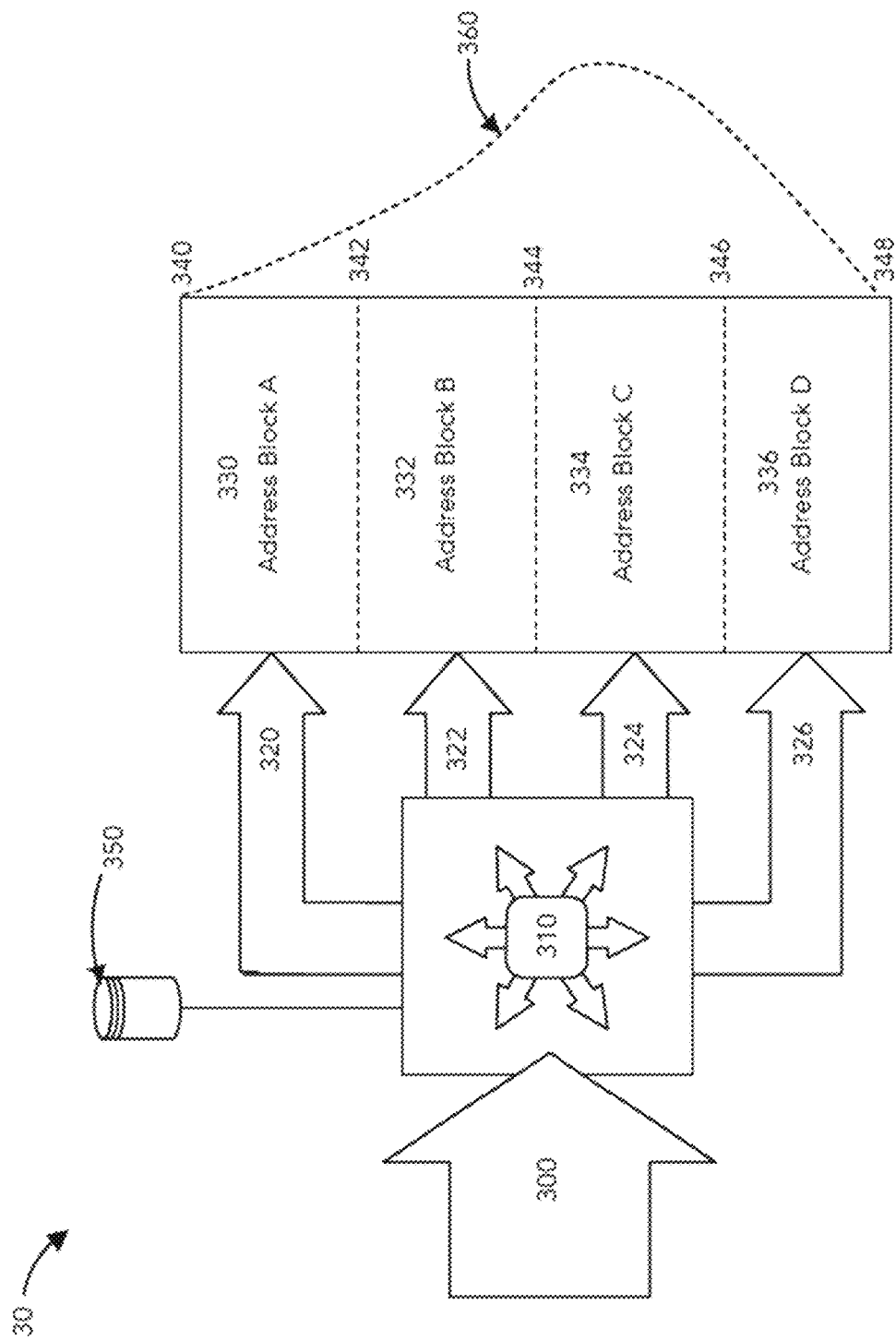
FIG. 3 illustrates routing message traffic through multiple address blocks.

FIG. 3 illustrates schematically a system and method 30 for quality-based routing (QBR) at the sending stage insofar as individual message traffic is allocated to different outgoing network address blocks based on ranked or rated quality metrics of said messages. Generally, a mailing list is prepared or pre-processed as described earlier, e.g., using a message processing server. The outgoing messages can be prepared from the mailing list applied to a message template to generate the individual outgoing electronic messages.

Outgoing message traffic 300 is provided to a message processing server or sending stage thereof. A message sorter 310, ranking engine or otherwise-named unit in or working with said server handles sorting or ranking or grading or quantifying each outgoing message from message traffic stream 300. The sorting or ranking can be accomplished as described herein, which sorting or ranking can be encoded into a set of rules stored in a data store or memory device 350 accessible by said message sorter 310.

Separate queues or pipelines 320-326 of outgoing messages are prepared and directed out of said sending stage according to one or more rules for said ranking or sorting. The message queues or pipelines 320-326 are sent over corresponding network address blocks 330-336, each block being of a known relative value or priority. For example, Address Block A (330) may be considered the highest quality or value block, Address Block B (332) may be of lesser quality or value, and so on in descending order to Address Block D (336). A quality-based message router according to the present invention may direct a best fraction of outgoing message traffic 320 to said greatest quality or value address Block A (330), and successive groups of outgoing messages 322, 324, 326 being directed to and sent out from correspondingly successively less valuable address blocks 332, 334, 336.

In yet another instance, the order of sending outgoing messages may be based on the expected quality and/or engagement rate for the outgoing traffic. That is, the system 10 may send higher quality or more likely to engage messages out before sending lower quality or less likely to engage messages. This way, receiving message processing systems can potentially be 'primed' for receiving the subsequent email traffic since the earlier messages were favorably delivered and were of higher quality.

In an embodiment, an address space available to the sender's message processing service can be subdivided into a plurality of sub-space address blocks 330-336. For example, the address space ranging from a starting or beginning address 340 to a final or ending address 348 in said space may be divided into several sub-spaces or address blocks as depicted, e.g., at intermediate addresses 346, 344 and 342. Those skilled in the art will appreciate that the address space 340 through 348 do not need to be contiguous or sequential, but may be organized in any format that the sending service is allocated to it and according to the protocol for addressing in the system at hand. Also, the relative size of the plurality of address blocks in the above sub-spaces for each message stream 320-326 do not need to be of a same size or bandwidth. In an example, a larger number or fraction of message traffic 300 may be sent over outgoing sub-space 326 over Address Block D (336) than is sent out using sub-space 320 over Address Block A (330), so that a larger fraction of overall message traffic 300 is sent over the lesser quality pipelines or address blocks. In another example, the greater fraction of outgoing message traffic is sent over the higher quality pipelines or address blocks. In yet another embodiment, several or many address blocks are defined, and a message density or volume profile 360 may be specified to indicate the relative density or volume of outgoing message traffic over the various address blocks according to where they fall on said profile 360. In an embodiment, the majority of the outgoing message traffic is directed over the address blocks of intermediate quality, for example approximating a normal distribution or bell curve having the greatest volume of traffic going out over the central or median quality address blocks, with a tapering profile of fewer messages going out over the highest and lowest quality address blocks. Bimodal, step function, sinusoidal or random profiles may be employed as best suits an application or design, which is an implementation feature that can be left to the operator of the message system.

In embodiments, a message management system may include one or more network-based message agents that may work cooperatively with other elements of the system to manage message routing, lifecycle event handling, network support and the like. One more of these message agents may be selected as a node or infrastructure resource in a route prepared for delivering a message as described herein, such as based on quality, based on conditions, based on events, and the like. A message agent may facilitate transfer of messages from an originating server that may perform message preparation, annotation, and the like to an intermediate node in the route to the recipient or directly to the recipient based on the route determined for the message. In embodiments, a message agent, such as a message transfer agent (MTA) may be the first node in the route to which a message preparation server sends a message. This transfer to the MTA may signal a lifecycle event, such as a type of processing event as described herein.

An MTA may include a processor that processes a message with network and control information, such as message headers and the like, to prepare it for delivery over an Internet-protocol-based network. As an example, an MTA may add header-related information that may facilitate identifying and/or tracking the message throughout at least a portion of its lifecycle. Other examples of actions that a processor of an MTA may take include security actions, such as signing based on the originator (e.g., sender) DNS records, so that security checks along the route may confirm that it is properly signed (e.g., using DKIM signing and the like).

An additional action that an MTA may perform on a message is to determine, based for example on the sender's DNS and the like, which Internet-based server an email should be initially routed through. In an example, if the sender DNS indicates that its domain is hosted by server at IP address 1234, then the MTA may transfer the email to the server at IP address 1234, so that the message route history stems from the sender's IP address, rather than a third-party address. The MTA may determine which IP address to use, among a set of available addresses of a sender (e.g., an enterprise or marketer that may be a client of the host of the platform), such as based on a table of IP addresses that matches information about the message (e.g., the sender's DNS records) with entries in the table. When a message has successfully been received by the Internet server at the sender's IP address, a processing event indicating the same may be recorded for the message in a message-specific lifecycle event record.

In embodiments, when a message is not received by the sender's Internet server, or some other problem arises (such as no IP address is found for the sender (e.g., the sender's DNS records are not in the IP table, and the like)), a retry process may be activated in the MTA.

Once a message is received by the sender's Internet server or other resource, the message may be sent from or on behalf of the sender via the MTA to one or more recipients, such as on a recipient list, according to a route as determined by the techniques described throughout this disclosure. The MTA may relay event status to or within the platform, such as relating to message delivery failure; for example, a form of message delivery failure may include the recipient's server signaling that it is receiving too many messages too quickly from the MTA. Yet another form of message delivery failure may include the recipient's Internet server rejecting the message for lack of trust of the domain from which the message is sent. Each of these types of message delivery failure may be classified based on the condition that resulted in the failure, such as a failure based on the sender's IP reputation, a failure based on a throttling bounce, a failure based on the inability to resolve DNS information, and the like. Under control of the platform and MTA, a retry process may pause a different amount of time before resending based on the type of message delivery failure. For example, among many possible configurations, a DNS bounce (e.g., no DNS) may be retried in one minute, an IP reputation bounce may be retried in several minutes, and a throttling bounce may be retried in a few dozen minutes.

In embodiments, delivery failure and retry attempts may be collected and analyzed over time and optionally input to a machine learning function that facilitates determining how to achieve successful delivery of messages most quickly. A range of factors may be included in such an analysis with the goal being to deliver the message with the fewest retries while also delivering it quickly. An outcome of such an analysis and learning process may be adjusting message delivery timing, message retry timing, message retry count, and the like to optimize these or other factors. An additional goal of such an analysis and learning process may be to deliver the message as soon as possible without any retries by adjusting aspects such as a rate of message delivery, time to retry a delivery failure and the like on a server-by-server (e.g., IP address) basis.

In embodiments, a retry process that may be executed by the MTA processor for a throttling bounce may be improved as follows. A first process executing on the MTA may capture throttle bounce responses. A second process executing on the MTA may capture and respond to messages. The second process may introduce a rate limit on responses that may effectively slow down the rate at which messages are sent to the MTA to be forwarded to a sender's IP server. By adjusting the response to received messages based on received throttle bounces, the platform may improve operation of the MTA processor, the network loading, the loading of the sender's IP server, the message platform server, and the like by reducing network traffic overall. Effectively, a process of internally throttling the message management platform throughput to balance with a rate of throttling by recipients and the like can have the added benefit of increasing the throughput when the external throttle rate is higher. In order to determine a rate at which to send email messages, a Proportional Integral Derivative (PID) controller may function to require gradually fewer changes as the throttling and rate limited bounces become more equal as follows:

$$e(t) = \frac{1}{2\pi} \arctan \frac{\text{(rate limited)} - \text{(throttled)}}{\text{(rate limited)} - \text{(throttled)} + 100} oldLimit(t)$$

Figure 9:
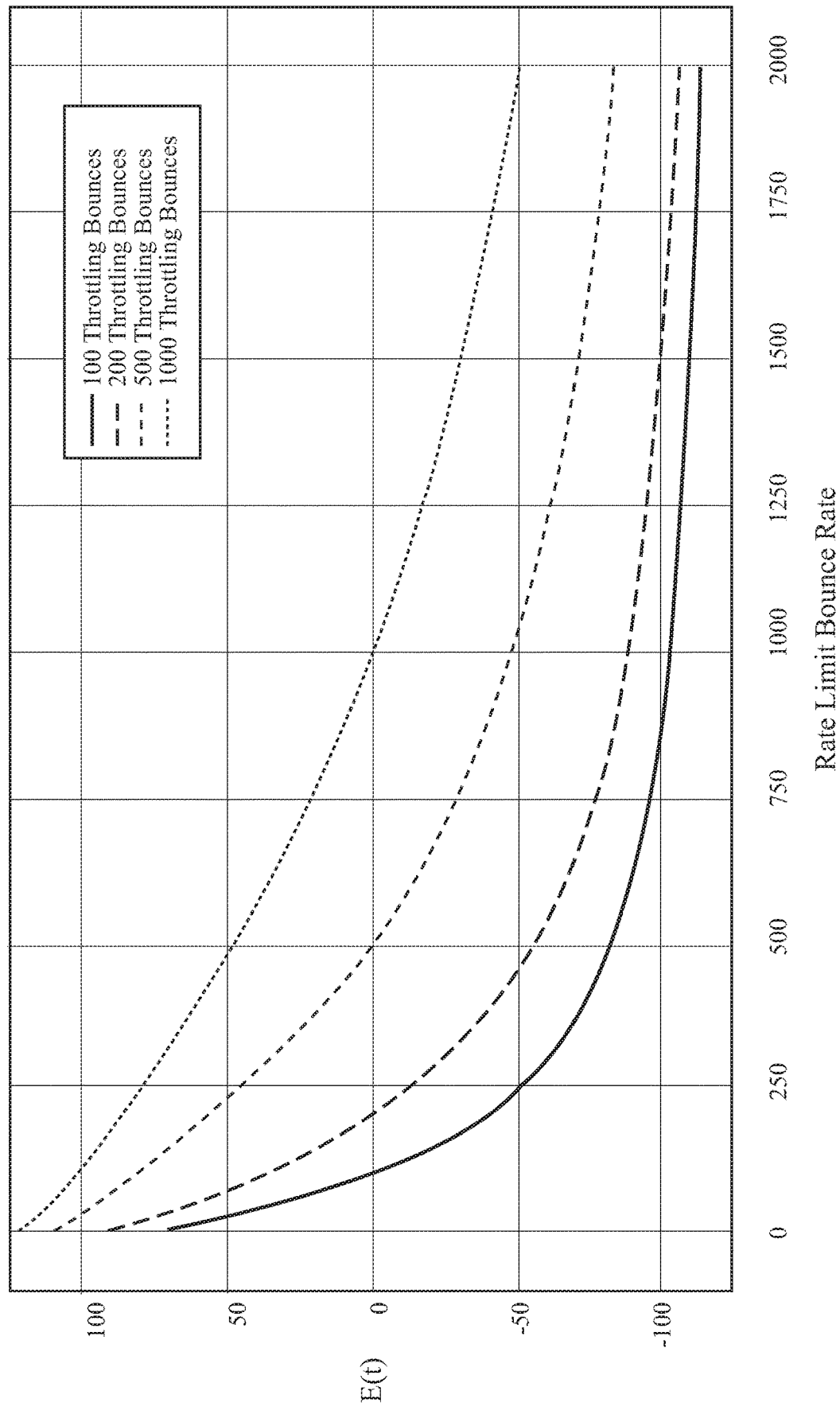
FIG. 9 illustrates an exemplary error rate over various throttling limits.

Also, referring to FIG. 9, which is a graphical depiction of an error function for various rate limit and throttling rates, the PID controller may define the optimal new rate based on a current rate as, for example:

$$L(t) = K_p e(t) + K_i \int e(t)dt + K_d \frac{de(t)}{dt} + L(t-1)$$

Where Kp, Ki, and Kd are approximated using a Ziegler-Nichols method.

Another aspect of sending between an MTA and a sender's Internet server may be based on a count of concurrent connections, or channels through which messages may be sent. Adjusting this number, such as by maximizing it, may further improve performance of the message management system by more efficiently utilizing the resources of the MTA, the sender's server and the like.

In embodiments connection optimization/learning may be based on a technique of slowly ramping up a number of concurrent connection pairs (e.g., various pairs among source IP addresses, domains or resources; MTAs or other infrastructure resources; destination IP domains, addresses or resources, and the like) until a throttling or "connection-refused" message is received.

In embodiments, a retry process may include a retry threshold that, when exceeded (e.g., exceeding a count of retries, a duration of retry activity, and the like for a message), may trigger the MTA processor to transfer the message to a secondary node, such as a pending message server to, for example, continue to attempt retries, but without continuing to load down the MTA, so that the MTA can be optimized for sending messages efficiently.

In embodiments, a message management system may include a plurality of transfer nodes, such as MTAs, that may each connect to a plurality of sender Internet servers. In an example, a single MTA may connect to a plurality, e.g., in an example, approximately forty (40), sender servers. Sender servers may be allocated to one or more MTAs based on a range of factors, such as load balancing and the like. In embodiments, allocating servers to MTAs may be based on a rule or guideline that limits the loading on an MTA beyond approximately 80% capacity, or about 32 servers in the above example. In embodiments, the message management system may add MTA nodes to maintain this loading as the number of senders with unique addresses increases. When addressing system failures, such as an MTA going off-line, the message management system may initiate a new MTA, distribute the servers for the off-line MTA to other MTAs, or a combination thereof.

In embodiments, an MTA may be configured with operational features that a message sender (e.g., email sender) or host of the platform may be configure, such as, without limitation, using HAproxy, TCP port 25 listening support, and the like. The MTA may use the HAproxy to transfer inbound replies (e.g., Internet-sourced email messages being sent to a sender's server) to the corresponding email inbound process on the sender's server (e.g., the sender's SMTP process) to handle the inbound email. This functionality may facilitate an external view of an MTA as a reputable message (e.g., email) server. HAproxy may further facilitate transfer of non-delivery reports, spam reports and the like for Internet-sourced messages handled by the MTA.

In embodiments, responses from recipients indicating non-delivery may be analyzed by, for example, the processor of an MTA to determine the condition of delivery or non-delivery of a message (many examples of which are described elsewhere herein). In an example, if a non-delivery response indicates that the domain or IP address of the sender or MTA is not trusted (e.g., may be marked as untrusted on a third-party domain blacklist), a result of analysis of such a response may be to generate an automated message to the responsive server to request removal from the blacklist. Additionally, third-party domain blacklists may be automatically queried in response to a blacklist non-delivery report, and, based on the result, an automatic message requesting removal from the black list may be generated and delivered to the third-party blacklist provider. In embodiments a continuously running ring buffer per blacklist type may be used to determine whether a number of backlist bounces exceeds a blacklist type bounce threshold over some time period. Once a threshold is breached, the impacted sender may be designated to be avoided for a time period. In embodiments, the period of time may be based on a count of senders to be avoided that may be compared to a maximum number of senders to be avoided, so that an impacted sender is again used for sending messages each time the count of senders to avoid exceeds the maximum number.

In embodiments, a message management system, such as for processing email messages, may include a Domain Name Server (DNS) manager function that may be configured as an API and/or as a separate executing process. The DNS manager function may interface, such as through an adapter with other third-party DNS servers (e.g., CLOUDFLARE, DNS MADE EASY, AKAMAI, and the like) to facilitate maintaining different DNS records on these and other third-party DNS servers. In embodiments, the DNS manager of the message management system may process and maintain DNS records including A records, C records, SPF records and the like. In embodiments, the DNS manager facility may generate an ANAME record that may effectively ensure that an A record for the DNS emulates the C record for the DNS by adjusting the A record based on the C record. In embodiments, the DNS manager facility may generate an ASPF record that provides DNS management of a Sender Policy Framework (SPF) without being constrained by the industry standard SPF record character or child constraints. A DNS manager function of the message management system may process an ASPF record that may allow for a greater number of characters and/or a greater number of children than an industry standard SPF record. In this way, the constraints of industry standard SPF records can be ignored by message agents and the like utilized by the message management system for messages passed among themselves. In embodiments, a query for the SPF record of a node, such as an MTA of or used by the message management system may result in a response that is adapted in response to the query based on the conditions present and/or associated with the query. In an example, an MTA A of the message management system may be configured to work with MTA nodes B, C, and D to send email to recipients. The processor of the MTA A may automatically configure an SPF record that identifies MTA B, C, and D as approved to send email on behalf of MTA A. An exemplary algorithm for generating an ASPF record may include the following steps:

1. Recursively build a set of all IP addresses to be included in the SPF record;
2. Search through this set for power-of-twos and generate a minimal number of subnet definitions (this may be accomplished, for example, by converting Thp4: 192.168.1.4 ip4:192.168.1.5" to 192.168.1.4/31);
3. Determine a maximum size SPF TXT record based on the hostname (e.g., hubspot.com) (in embodiments this size is from 405 to 413 characters in the record);
4. Apply a knapsack algorithm that fits the string representation of ranges in the largest possible TXT records; and
5. When more than the maximum size of T×T records is required, add an "include" operator into the SPF TXT string that references (e.g., includes) a new/next SPF child record automatically named "HOST"+$ID, where $ID is the next incremental index for an SPF record. In an example, an SPF for a domain like hubspot.com may include the "include" operator for "hspf1.hubspot.com", and this file may include "hspf2.hubspot.com", etc.

In an aspect, the system 100 may aggregate the engagement rates for a recipient (e.g., a particular recipient email address) and determine whether this recipient/address is likely to engage in any communication regardless of its sender, nature or quality. In particular, a recipient or address may be monitored and if the recipient or address are deemed to never engage with messages sent thereto then the recipient or address may be unused, purchased, disabled, or otherwise unfit for targeting by senders, and is likely to degrade the overall network reputation of persons and entities involved in soliciting this sender or address.

In embodiments, a message management system may process a list of message recipients with a list quality scoring algorithm that may facilitate detecting potentially troublesome or high-risk recipient lists. Each recipient in a message list may be processed by the message management system to produce a recipient contact record with a set of recipient contact fields. Such a scoring algorithm may analyze content of each recipient contact record in the list, accessing items such as the recipient domain, recipient contact fields (such as first name, last name, industry, etc.) and the like. For example, if these fields are present, the scoring algorithm may score the recipient higher than if many of the fields are not present. In an example, if the only recipient information in the received list is the email address of the recipient, the recipient contact may score low, such as 0 or 1 on a scale of 0-10 (low-high). If, in the example, the recipient information for another recipient includes full name, industry information, website, LINKEDIN or other third party social networking contact information, and the like, such a recipient contact record may score high, such as 9 or 10 on the scale. This recipient rating may be calculated for each recipient in a recipient list and aggregated so that a recipient-list score may be determined (e.g., summed, averaged, converted into percentiles and the like).

In embodiments, other information about the recipient may already be known to the system if the recipient has already been processed by the system (e.g., on another email list for this or another sender). This other information may indicate measures of the recipient, such as an open rate, a reject rate, an interaction rate, and the like that may be derived by information handled by the platform, such as from message lifecycle event records captured about the recipient.

In embodiments, the recipient contact record information from the received recipient message list, the recipient list information rating, and the other recipient-specific information may be input to a model (e.g., a regression model) or a machine learning system (such as an artificial intelligence system like a neural network, deep learning system, or the like), or a hybrid thereof, that may predict a probability of a bounce for each contact. The predicted probability maybe on a scale of low probability of a bounce (e.g., less than 10%) to high probability (e.g., greater than 70%). This recipient-specific bounce probability may then be processed for all recipients in the list to produce an expected percent of recipients in the list to result in a bounce. In embodiments, the number of recipients with a high bounce probability may be divided by the total number of recipients to determine a list-specific bounce ratio that may be converted into a percentage. In embodiments, the number of recipients with a high bounce probability may be divided by the number of recipients with a low bounce probability, effectively excluding those with a low bounce probability from this calculation. A result may be a list bounce risk factor that may be used when determining how the system may handle the list. The list-specific bounce ratio may be applied to a list behavior scale rating from 1 (low) to 5 (high). Lists with high list-specific bounce ratios may receive a low behavior rating, whereas lists with low list-specific bounce ratios may receive a high behavior rating. In embodiments, any of the recipient list scores, ratings, risk measures and the like described herein may be used in a list ingestion process to automatically determine if a list should be processed and messages sent to recipients in the list. In embodiments, the recipient-specific scores, ratings, risk measures and the like may be used when processing the list to control whether and how a message should be sent to the recipient. Messages destined for recipients with low scores may be left undelivered, or may be delivered using lower priority resources, delivered after delays, or the like.

In embodiments, performance over time of message senders (e.g., clients of the message management system) may be calculated through summarization of behavior of recipients to which messages have been sent on behalf of the client over a window of time, such as a rolling window. As an example, a client or sender time window-specific rating may be based on a calculation that includes bounces, spam rejections, message opens, message content interaction, and other measures, including lifecycle events and other quality measures as described throughout this disclosure. These "negative" events may be tallied and normalized for the number of recipients processed for the client in the window. A result may be compared to comparable calculations for other clients to determine a ranking or other measure of a sender or client, or of an IP address, sender email address, domain, or other resource of a sender or client. Such a comparison may, in embodiments, be refined by comparing senders or clients within similar industries. These scores may be recorded and tracked over time to determine trends for individual clients or senders, for industries, and the like. In embodiments, a trend threshold may be established and a trend monitoring function may compare a trend for each client or sender against the trend threshold. When the threshold is exceeded, a trend challenge signal may be automatically generated. In response to the trend challenge signal, a report of prior and current window information about the client or sender may be automatically produced to facilitate diagnosing what caused threshold to be exceeded. Candidate conditions, which may be stored in a library of threshold trend failures, may be accessed and used in an automated process to determine whether any such conditions exist in the report. In an example, a candidate condition may be that a message list includes a high percentage of new recipients. An automated diagnosis process may be executed to generate this percent for the list(s) in the current window and, if they exceed the new recipient threshold, the signal may be adjusted to indicate the presence of many new recipients as a candidate cause.

In embodiments, a message management system may send messages to a subset of all recipients on a recipient list as a trial or sample to validate that the list performance will be acceptable. Results of the sample may be analyzed to determine if the remainder of the recipients should be messaged. The sample size may be dynamically calculated, such as based on the predicted bounce rate for the list, a predicted degree of engagement, or other metric, such as any of the quality metrics described herein. The sample size may also be calculated based on other bounce-related or other metrics, such as a bounce rate for the client, a bounce rate for the client's industry, a bounce rate for recipient domains in the list, and the like. Once the sample size is determined, a portion of the recipients consistent with the sample size may be messaged. This sample of messages may be monitored, such as by checking the lifecycle event records being collected for the messages in the sample over a period of time, such as several minutes (e.g., 6 minutes and the like). If the bounce rate for the sample is consistent with expectations, such as the predicted bounce rate for the list, then the remainder of the list may be messaged. In embodiments, a sample that exhibits an unexpectedly high hard bounce rate, such as of approximately 15% or more beyond a determined 95% hard bounce confidence interval, may cause the rest of the recipient list to be skipped. In embodiments, a sample that exhibits a spam report rate of, for example, approximately 0.2% or more beyond a determined spam confidence interval (e.g., 90%, 95%, 99% or the like) may cause the rest of the recipient list to be skipped. In embodiments, a sample that exhibits an unsubscribe rate that is above a threshold, e.g., approximately 3%, 5%, 10% or more beyond a determined unsubscribe confidence interval (e.g., 90%, 95%, 99% or the like) may cause the rest of the recipient list to be skipped.

In embodiments, a message management system may monitor activities of clients over time, such as cancellations or list rejections and the like. In embodiments, by tracking such activity, clients may be blocked from repeated attempts to send messages using unacceptable lists. Newly submitted lists can be analyzed against prior unacceptable lists (e.g., from the particular client) so that even if only a portion of an unacceptable list was submitted it could be detected as comprising a portion of the unacceptable list.

In embodiments, a message management system may collect and manage IP addresses to facilitate determining which IP addresses (e.g., recipient domains) might be bad email addresses (e.g., email addresses that cannot be resolved, email addresses that bounce as a result of no user being found, and the like). One type of IP address that may be managed or recognized as a bad domain is an email reception domain that is configured merely to detect senders who try to send email to the domain, because the domain does not have any email users. These types of domains may be configured by entities seeking to limit unwanted email traffic, such as to trap and recognize senders of spam content. By the message management system recognizing these domains, and by recognizing other bad email addresses, sending messages to recipients with bad email addresses can be avoided. In embodiments, a client can be graded based on a measure of bad email addresses provided in an email list. In an example, by recognizing a client or sender who provides recipient lists with recipient addresses that the system has determined to be bad, the system can avoid sending messages to the bad addresses. In embodiments, the system may use this information to rate the clients or senders, so that clients or senders that provide recipient lists with a high percentage of good email addresses, or with a very low percentage of bad email addresses, may be prioritized above clients or senders that send recipient lists with a high percentage of bad email addresses.

According to another aspect of this invention, the message processing server 100 may provide a smart-suppress feature by applying a programmed methodology to intelligently suppress an entire mailing list 12 or selected portions or addresses 112 thereof so as to protect a sender or a sender's provider from unwanted negative consequences of over-inclusion of ineffective or contraband addresses in a mailing list 12. In an example, the sender may elect to activate such a smart-suppress feature based on an automated calculation of the relative benefits and liabilities with respect to given mailing lists or individual addresses in such lists. In another example, the message processing server 100 may enforce such logic on its users (senders) to protect the online reputations of the parties involved in sending messages from said server. One instance could be to monitor, track and rate a sender, and if the sender is determined to be a low quality or spammy sender then this step can be applied to the sender. In yet another example, the sender or an administrator of the message processing server can select a quantitative value for smart suppression, or a threshold or other value used to determine the binary or sliding value scale on which smart suppression is applied.

Figure 2:
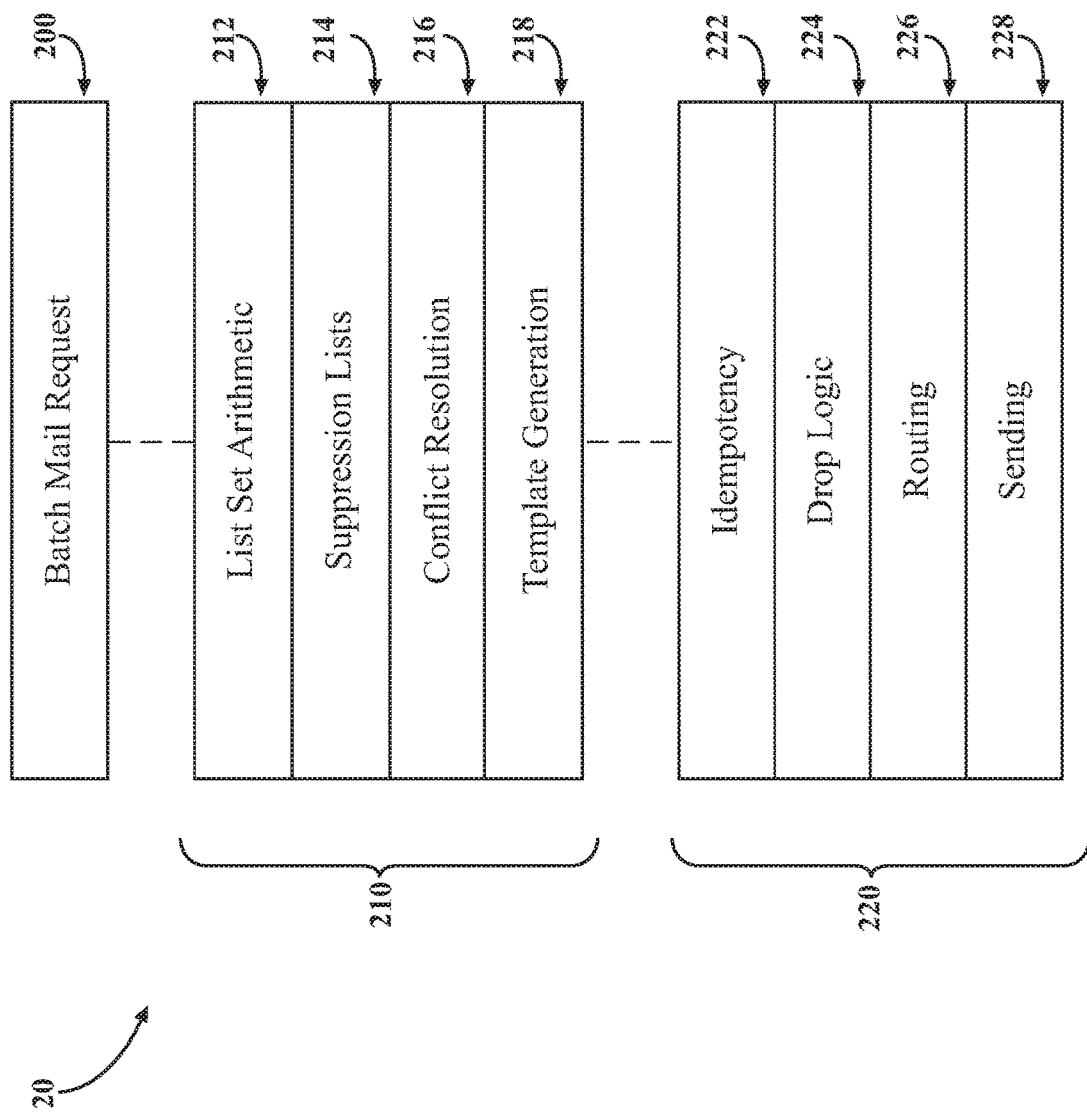
FIG. 2 illustrates an exemplary set of steps used in pre-processing and preparing and sending an electronic mail message.

FIG. 2 illustrates some steps in an exemplary process for batch processing outgoing electronic messages based on a mailing list. The process begins at 200 with a batch mail request by a sender 199. The sender may be a user who subscribes to or uses the services of a mail processing server 100 and architecture 10 as described earlier. A mailing list 12 containing a plurality of recipient addresses 112 (e.g., email addresses) is uploaded by sender 199 to the mail processing server 100. The list may be uploaded as a text file, spreadsheet, binary file or in another format as appropriate. The list 12 may be evaluated as a whole as discussed further herein. The list 12 may be scored, passed, failed, or otherwise ranked as a whole, which may result in server 100 rejecting the list and no emails are prepared or sent based on it. On the other hand, the list 12 may be acceptable on the while, and further analysis or processing of the addresses 112 therein can be carried out and each corresponding email to an individual address treated according to other settings and needs as understood by those of skill in the art.

Server 100 parses the contents of the uploaded list 12 to pre-process the list 12 in a batch email processing subsystem at 210. The batch email processing subsystem applies one or more tests or steps in pre-processing the batch mailing list 12. The pre-processing steps can include: a list set arithmetic 212; suppression lists 214; conflict resolution 216; and template generation 218.

After pre-processing 210, the system and method 10 apply a sending stage 222 to prepare and send the electronic messages. In one view, this stage can be considered a sending service. The sending stage 220 may include steps of idempotency 222; drop logic 224; routing 226; and finally, sending of each generated electronic message at 228. Idempotency 222 is intended to avoid sending redundant copies of an email to a same user more than once.

Turning to another aspect of the present system and method, some embodiments a traffic throttling or metering process to outgoing message traffic allocation as a function of time. It is desirable in some systems and methods to determine an ideal or a maximum rate of email sending that is consistent with the settings of the relevant mail service provider and message architecture. Determining this rate can be useful to increased message processing and sending capabilities.

For a given email architecture a maximum limit may be imposed on the rate of email sending allowed for a given user or users generally. To increase the number of outgoing messages sent per unit time, it can be wise not to exceed the pre-set system limit for outgoing message traffic, as exceeding this limit can result in unwanted consequences such as the account or address of the sender being shut down or limited in another way. Therefore, aspects of this method and system work to start sending messages at a reduced rate initially, gradually increasing the sending rate (messages/unit time) to determine if the outgoing message traffic becomes blocked or limited at some pre-set rate.

Figure 4:
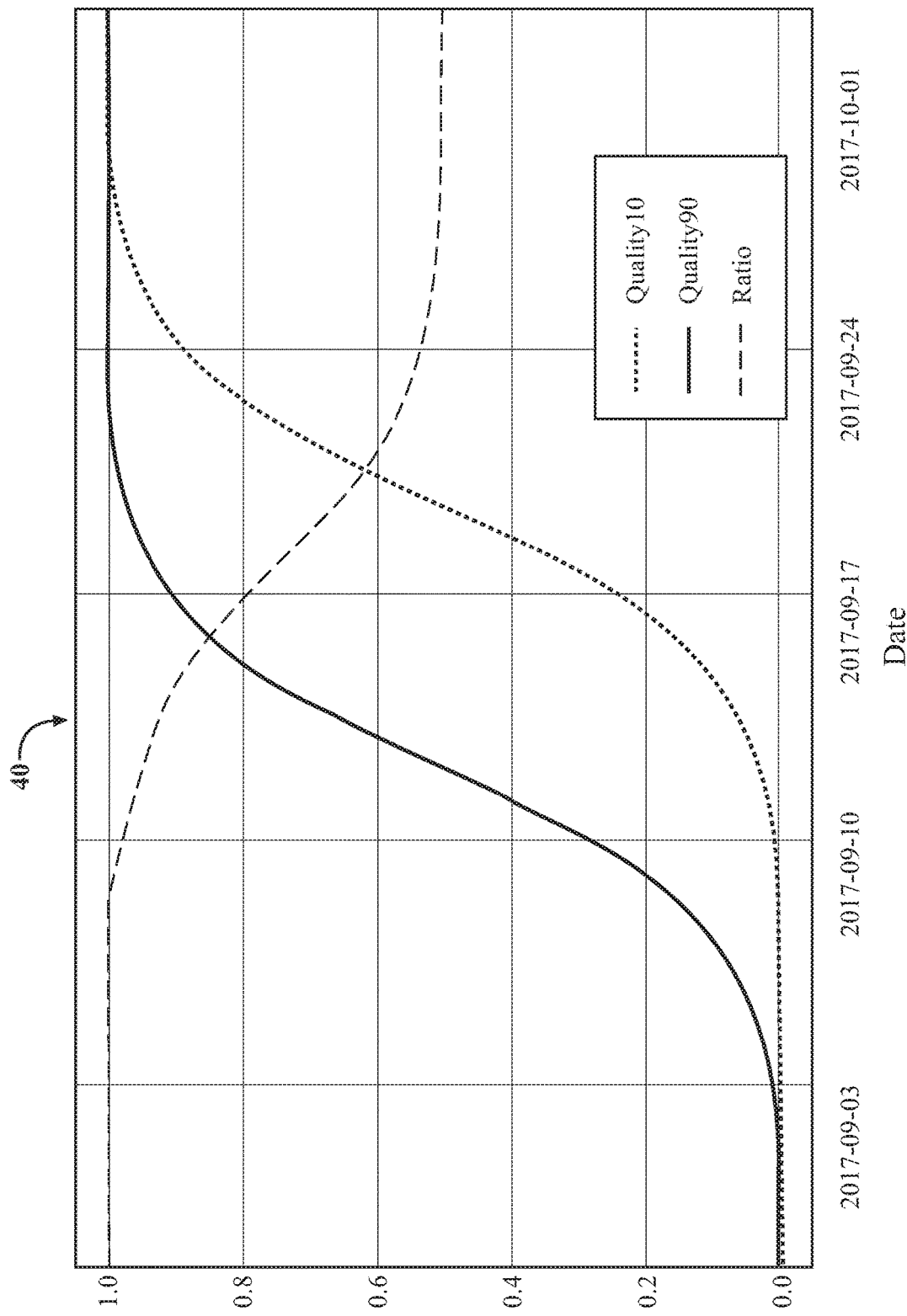
FIG. 4 illustrates ramping up message traffic or volume as a function of time.

FIG. 4 illustrates a representation of a volume of outgoing message traffic 42 on the vertical axis plotted against a horizontal time axis 44. Both volume 42 and time 44 can be represented in a variety of ways as suits an application and as would be appreciated by those skilled in the art. For example, volume 42 may be measured in the number of sent messages per unit time (hour, day, etc.), the number of megabytes (cumulative size) of the outgoing message traffic, or any other metric. Time can be considered in units of seconds, hours, days or other linear or logarithmic units as suits a given purpose. Roughly speaking, the volume of traffic 42 is a measure of the quantity of sent messages and the time 44 is a measure of the maturity of an outgoing message sending pipeline such as the address blocks referred to earlier. Here, we are considering an amount of time that a sender has been using a message sending pipeline or address block.

In a general respect, some embodiments meter, throttle or otherwise control the volume of outgoing message traffic 42 as a function of time 44. In an aspect, a sender can be allocated increasing bandwidth or volumetric permission according to a profile curve 410 determined by one or more rules applied by the message processing server. Here, the sender given sending privileges according to the rule depicted by profile curve 410 has a starting message sending capacity 412, which increases over time to a greater capacity 414. Another customer may be accorded sending privileges defined by curve 420, which, as seen starts this sender at an initial sending rate of 422 and progresses to a more robust sending rate of 424 after some time. The maturation time where a sender reaches a maximum sending permission rate or volume can depend on the sensitivity of the sending channel. For example, the sending service provider may not have historical familiarity with a given sender or mailing list and may automatically limit the sender to the lower sending volume or rate 412, 422. Then, once the sender and his or her outgoing message traffic develops a favorable and lower risk profile (e.g., an online reputation) the sending service can automatically raise the sender's sending permissions to the higher levels 414, 424. Once again, the curves 410, 420 are only examples, but in practice a step function or other pattern of dynamically changing the volume-versus-time profile of a sender is entirely possible. In some examples, the present limits may be user-specific. In other examples, the present limits are determined more broadly based on the receiving email system and its configuration and requirements. Any number of implementations of the present concept can be applied by the sending infrastructure and based on rules encoded into instructions stored in a data store and executed by the message processing server.

In embodiments, message routing may be determined on a message-by-message basis, including dynamically based on various parameters or conditions. Routing information may include, for each message, one or more of an email address (such as from among a set of sending email addresses of a client or sender), an IP address (such as from a set of IP addresses from which email may be sent), one or more sending servers, a sender's domain, one or more of a set of Internet Service Provider servers or other Internet resources, one or more MTAs, one or more routing quality tranches, a recipient email address, a recipient domain, a recipient server or other infrastructure element, and the like. Aspects of quality (described above and elsewhere herein), such as client reputation, recipient score, client/sender-to-recipient relationship, and other measures of message-related quality may be used when dynamically routing a message. Other aspects that are considered when determining a route for a message may include whether the client has a dedicated Internet mail service provider, the level of messaging service the client is purchasing, the application that the client is using to originate the message and deliver the recipient address list, client and recipient DNS considerations, time, network conditions, traffic conditions, information about campaigns, and reputation information, among other things.

In embodiments, a message management system may facilitate working with a client that has a dedicated Internet mail service provider that is new on the network, such as if it has little or no history of sending messages over the Internet. To facilitate establishing a good reputation as a message source (e.g., email sender), the system may limit messages being sent on behalf of the new client IP to those with high quality, or at least messages that will not be rejected as spam, bounce, or otherwise fail delivery. This may be an automated process that selects only high-quality recipients (those that are not likely to produce a bounce and the like) from the sender's list of recipients during an initial message sending phase for the new server. The initial message sending phase may be predefined (e.g., 60 to 90 days), configured based on prior new server initial sending phase data, and the like. Over time, the automated process may introduce into the mix of messages being sent on behalf of the new server messages to recipients that may be other than high quality, with a goal of sending to all included recipients (e.g., not those excluded as spam traps, known invalid email addresses, and the like) in a sender's recipient list.

In embodiments these automated ramp-up techniques may be applied to senders who have inconsistent and widely ranging volume requirements, so that as a sender resource that has not sent a large volume of messages in the recent past requests sending a large volume of messages (e.g., submits a long recipient list), the volume of message output may be throttled to ensure that a sudden burst of messages does not compromise the sender's or a sending resource's reputation. This may be done automatically based on ramp-up rate rules.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

Additional Statements of the Disclosure

In some implementations, MTA management with dynamic routing based on quality of engagement may be described in the following clauses or otherwise described herein and as illustrated in FIGS. 1-9.

Clause Set A

Clause 1. A method for managing sending of a batch of emails via at least one message transfer authority, comprising receiving a message recipient list, receiving a message to be sent to the recipient list, evaluating a message delivery readiness indicator for at least one recipient in the received recipient list, based on a result of the evaluating: removing one or more recipients, if any, for which the message readiness indicator does not indicate readiness, locking the recipient list from further changes, generating a message based on the received message for each of at least a portion of the recipients in the recipient list, calculating a probability of engagement metric for each generated message comprising a probability of recipient engagement, determining, based on the probability of engagement, at least one of: at least one node and IP address of a networked server in an Internet Protocol-based network from which the generated message will originate, and at least one message transfer agent for transferring the message to the at least one recipient, coordinating the networked sever to send the generated message from the IP address via the at least one determined message transfer agent, and repeating the steps of calculating, determining and coordinating until all messages in the portion of the recipients have been forwarded to a message transfer agent.

Clause 2. The method of clause 1, further comprising unlocking the recipient list when bytes of all messages in the portion of the recipients have been received by at least one message transfer agent.

Clause 3. The method of clause 1, wherein the probability of engagement is a calculation of a likelihood that a recipient will open the message.

Clause 4. The method of clause 1, wherein receiving a message recipient list comprises: ingesting the list, and generating a recipient contact record for each recipient in the list for which a recipient contact record does not exist and updating a recipient contact record based on a comparison of recipient information in the recipient list with a corresponding recipient contact record for each recipient for which a recipient contact record exists.

Clause 5. The method of clause 4, wherein the recipient contact record is compared to a contact record in a contact management system of an enterprise.

Clause 6. The method of clause 1, wherein receiving a message recipient list comprises executing an application programming interface (API) function to process a call made to the API from a client messaging server.

Clause 7. The method of clause 1, wherein receiving a message recipient list comprises requesting information for at least one recipient from a client message application by accessing an API of the client message application.

Clause 8. The method of clause 1, wherein receiving a message recipient list comprises accessing a workflow of a client server.

Clause 9. The method of clause 1, wherein receiving a message recipient list comprises processing a script that enables access to recipient list information on a client server.

Clause 10. The method of clause 1, wherein receiving a message recipient list comprises receiving a plurality of mutually exclusive recipient lists that separate included recipients from excluded recipients.

Clause 11. The method of clause 1, wherein receiving a message recipient list comprises tagging each recipient information record as one of included, excluded, suppressed, bad, malicious, and unreachable.

In some implementations, MTA management with dynamic routing in general may be described in the following clauses or otherwise described herein and as illustrated in FIGS. 1-9.

Clause Set B

Clause 12. A system comprising: a message recipient list interface adapted to receive recipient lists in a plurality of formats, a message interface through which a client provides message content, a message delivery readiness filtering module that operates to prevent delivery of messages to recipients in the list if a message delivery readiness indicator indicates delivery of messages to recipients in the list should be blocked or delayed, a message generation module that generates a message for each of at least a portion of the recipients in the recipient list based on the message content and message routing and control information, a message route determination module that determines at least one of a sending IP address and a message transfer agent between which the generated message will be routed, wherein the determination of at least one of the a sending address and the message transfer agent is determined dynamically based on at least one indicator relating to at least one of the delivery of messages, the rejection of messages, and the engagement with messages handled by the system, a processor for executing at least one of the filtering module, the generation module, and the route determination module, and a message transfer agent node connected to a server executing the message route preparation module, wherein the message transfer agent node receives a message for at least one recipient in the recipient list, configures the message for routing over the IP-based network, and routes the configured message based on the prepared route.

Clause 13. The system of clause 12, further including a recipient engagement probability calculating model that generates a probably of recipient engagement for each of a portion of the recipients in the recipient list.

Clause 14. The system of clause 12, wherein the processor is further adapted to generate a recipient contact record for each recipient in the list for which a recipient contact record does not exist and updating a recipient contact record based on a comparison of recipient information in the recipient list with a corresponding recipient contact record for each recipient for which a recipient contact record exists.

Clause 15. The system of clause 12, wherein the message recipient list interface module comprises an Application Programming Interface that processes calls to the message recipient list interface from a client messaging server.

Clause 16. The system of clause 12, wherein the message recipient list interface module performs an API call to a client messaging server requesting at least one message recipient information.

Clause 17. The system of clause 12, wherein the message recipient list interface module receives a plurality of recipient lists and determines for each list if the recipients on the list should be included or excluded from receiving the received message.

Clause 18. The system of clause 12, wherein the processor is further adapted to calculate an engagement metric for each generated message comprising a probability of recipient engagement.

Clause 19. The system of clause 12, further comprising a plurality of message transfer agent nodes.

Clause 20. The system of clause 12, wherein the route preparation module determines nodes through which the generated message will be routed based on a quality metric of the recipient.

Clause 21. The system of clause 12, wherein the route preparation module determines nodes through which the generate message will be routed based on a reputation of a networked server of the client.

In some implementations, quality-based routing and sender quality may be described in the following clauses or otherwise described herein and as illustrated in FIGS. 1-9.

Clause Set C

Clause 1. A method of preparing a route for a new message through a plurality of networked nodes in an Internet Protocol-based network, comprising: calculating a sender quality score based on at least one message engagement event by at least one recipient with respect to at least one message previously sent by the sender, applying at least one model to determine a probability of a recipient engaging with the new message based on the sender quality score, and based on at least one of the quality score and the determined probability, selecting among a plurality of available routes for the new message, wherein a route includes a sending IP address and a message transfer authority for the message.

Clause 2. A method of clause 1, wherein the at least one model is at least one of a logistic regression model and a beta distribution model that takes into account a number of messages sent to the recipient.

Clause 3. The method of clause 1, wherein the sender quality score is calculated based on a number of recipient open events and recipient message link engagement events recorded for the recipient.

Clause 4. The method of clause 1, wherein the sender quality score is calculated based on a reputation of the sender determined a least in part by processing the sender's contact information.

Clause 5. The method of clause 1, wherein the sender quality score is calculated based on availability of information in contact information for the sender associated with contact information fields including at least one of first name, last name, industry, phone number, address, related contact, and social network identifier.

Clause 6. The method of clause 1, wherein the sender quality score is calculated based on sender domain information.

Clause 7. The method of clause 1, wherein the sender quality score is calculated based on a measure of time since the last recorded message open event recorded for at least one of a message sent by the sender.

Clause 8. The method of clause 1, further including computing fixed percentiles for different routes based on message life cycle event activity for messages delivered over the different routes, determining a route-specific probability of engagement for each route based therein, and applying the determined route-specific probability of engagement when selecting a route.

Clause 9. The method of clause 1, further comprising selecting among a plurality of quality-specific tranches of available routes based on a prediction of the probability of engagement for the message.

Clause 10. The method of clause 1, wherein selecting a route for the message with the selected quality-specific tranche includes applying a machine learning system to determine which route produces a greater likelihood of engagement for parameters of the message than other routes in the tranche of routes.

In some implementations, quality-based routing based on quality of sender-recipient relationship may be described in the following clauses or otherwise described herein and as illustrated in FIGS. 1-9.

Clause Set D

Clause 1. A method of preparing a route for a new message through a plurality of networked nodes in an Internet Protocol-based network, comprising: calculating a sender-recipient relationship quality score based on at least of a message engagement event for at least one of a sender and a recipient with respect to at least one past message and at least one record of interactions between a domain of the sender and a domain of the recipient; applying at least one model to determine a probability of a recipient engaging with the message based on the quality score; and based on at least one of the quality score and the determined probability, selecting among a plurality of available routes for the message, wherein a route includes a sending IP address and a message transfer authority for the message.

Clause 2. A method of clause 1, wherein the at least one model is at least one of a logistic regression model and a beta distribution model that takes into account a number of messages sent to the recipient.

Clause 3. The method of clause 1, wherein the quality score is calculated based on a number of recipient open events and recipient message link engagement events recorded for the recipient.

Clause 4. The method of clause 1, wherein the quality score is calculated based on a reputation of at least one of the recipient and the sender determined a least in part by processing the sender's contact information.

Clause 5. The method of clause 1, wherein the quality score is calculated based on availability of information in contact information for at least one of the recipient and the sender associated with contact information fields including at least one of first name, last name, industry, phone number, address, related contact, and social network identifier.

Clause 6. The method of clause 1, wherein the quality score is calculated based on at least one of sender domain information and recipient domain information.

Clause 7. The method of clause 1, wherein the quality score is calculated based on a measure of time since the last recorded message open event recorded for at least one of a message sent by the sender and a message received by the recipient.

Clause 8. The method of clause 1, further including computing fixed percentiles for different routes based on message life cycle event activity for messages delivered over the different routes, determining a route-specific probability of engagement for each route based therein, and applying the determined route-specific probability of engagement when selecting a route.

Clause 9. The method of clause 1, further comprising selecting among a plurality of quality-specific tranches of available routes based on a prediction of the probability of engagement for the message.

Clause 10. The method of clause 1, wherein selecting a route for the message with the selected quality-specific tranche includes applying a machine learning system to determine which route produces a greater likelihood of engagement for parameters of the message than other routes in the tranche of routes.

In some implementations, throttling throughput to match a throttle/concurrent connection limit of a recipient domain may be described in the following clauses or otherwise described herein and as illustrated in FIGS. 1-9.

Clause Set E

Clause 12. A method of matching a throughput rate of a message management platform with a throttle rate of a recipient, comprising: determining a rate at which messages sent to a recipient domain receive a throttling limit rejection by the recipient domain; and applying a proportional integral derivative algorithm to control a rate of message delivery to the recipient based on the determined throttling rate of the recipient domain, wherein the rate of change of the rate of message delivery reduces as the recipient domain throttling rate and the rate of message delivery converge.

Clause 13. A method of concurrent connection maximization, comprising: increasing a quantity of logical connections between a source email sender and destination email recipient server; repeating the increasing quantity step while tracking the quantity of logical connections; receiving a connection refusal signal from the destination email recipient server and recording the tracked quantity of logical connections active when the connection refusal signal is received; storing in a recipient status data set the quantity of logical connections active when the connection refusal signal is received; and upon initiation of a new message send request to the recipient, configuring the number of logical concurrent connections stored for the recipient in the recipient status data set and sending messages over the concurrent connections within a threshold indicated by the stored number of logical concurrent connections.

In some implementations, abuse mitigation, portal score and trend failure diagnosis may be described in the following clauses or otherwise described herein and as illustrated in FIGS. 1-9.

Clause Set F

Clause 5. A method of scoring a client of a message management system, comprising: calculating a client performance measure for a plurality of types of message life cycle events for messages sent on behalf of the client in a window of time; determining an industry associated with the client; comparing the measure for the client to an average measure for other clients associated with the determined industry; trending the client performance measure over time; and recommending a source of trend failure based on the trending of the client performance measure over time exceeding a trend failure threshold.

Clause 6. The method of clause 5, wherein the plurality of types of message life cycle events consists of bounces, spam rejections, recipient opens and recipient content clicks.

Clause 7. The method of clause 6, wherein the client performance measure is calculated by adding the percent opens and percent clicks and subtracting the percent bounces and percent spam.

Clause 8. The method of clause 5, wherein recommending a source of trend failure comprises comparing a percent of new recipients in a recipient list processed in the window of time to a new recipient percent threshold and based on the comparison selecting a candidate source of trend failure from a list of candidate sources of trend failure.

In some implementations, abuse mitigation and chunk sending may be described in the following clauses or otherwise described herein and as illustrated in FIGS. 1-9.

Clause Set G

Clause 9. A method comprising: calculating a size of a sample of a message recipient list that delivers a confidence level greater than threshold for the entire recipient list by applying a predicted bounce percent for the list to a sample size selection algorithm; selecting a total of recipients in the recipient list that is consistent with the sample size; processing messages to each of the recipients in the sample set; monitoring message life cycle events for the recipients in the sample set over a period of time; and based on the monitoring taking an action with the recipient list selected from a list of recipient list actions consisting of processing the remaining recipients in the recipient list and halting processing of the recipient list.

Clause 10. The method of clause 9, wherein the period of time is a number of minutes less than ten minutes.

Clause 11. The method of clause 9, wherein the period of time is determined when a threshold percentage of recipients produce life cycle events that include a recipient message engagement event.

Clause 12. The method of clause 11, wherein the threshold is greater than at least one of 90%, 95% and 99%.

Clause 13. The method of clause 9, wherein selecting the recipients comprises selecting recipients in an order in which they are stored in the recipient list.

In some implementations, MTA Router and ASPF record generation and handling may be described in the following clauses or otherwise described herein and as illustrated in FIGS. 1-9.

Clause Set H

Clause 1. A method of generating a sender policy framework (SPF) record comprising: preparing a list of Internet Protocol (IP) addresses to be included an SPF record for a domain, searching the list for IP addresses that can be represented as a continuous string of IP addresses; converting the IP addresses that can be represented as a continuous string from individual IP addresses to inclusive IP address group designators; using a knapsack algorithm, generating an SPF record that maximizes the number of IP addresses for a given SPF record size; storing the IP addresses identified by the knapsack algorithm into a first SPF record; and updating the SPF record with a reference to a subordinate SPF record based on the number of IP addresses in the list exceeding the maximum determined from the knapsack algorithm for the first SPF record.

Clause 2. The method of clause 1, wherein the second SPF record reference includes the domain plus an identifier that is a whole number greater than the SPF record reference for the first SPF record.

Clause 3. The method of clause 1, further comprising repeating the converting, knapsack algorithm, storing and updating steps for the second SPF record.

Clause 4. The method of clause 1, wherein the updating step is in response to at least one new IP address needing to be included in the SPF record for the domain.

What is claimed is:

1. A method comprising:
   calculating a size of a sample of a message recipient list that delivers a confidence level greater than threshold for the entire message recipient list by applying a predicted bounce percent for the list to a sample size selection algorithm;
   selecting a total of recipients in the message recipient list that is consistent with the sample size;
   processing messages to each of the recipients in the sample;
   monitoring message life cycle events for the recipients in the sample set over a period of time; and
   based on the monitoring taking an action with the message recipient list selected from a list of recipient list actions consisting of processing remaining recipients in the message recipient list and halting processing of the message recipient list.

2. The method of claim 1, wherein the period of time is a number of minutes less than ten minutes.

3. The method of claim 1, wherein the period of time is determined when a threshold percentage of recipients produce life cycle events that include a recipient message engagement event.

4. The method of claim 3, wherein the threshold is greater than at least one of 90%, 95% and 99%.

5. The method of claim 1, wherein selecting the recipients comprises selecting recipients in an order in which they are stored in the message recipient list.

* * * * *

UNITED STATES PATENT AND TRADEMARK OFFICE
CERTIFICATE OF CORRECTION

PATENT NO. : 10,911,394 B2
APPLICATION NO. : 15/884268
DATED : February 2, 2021
INVENTOR(S) : Jake Kramer et al.

Page 1 of 1

It is certified that error appears in the above-identified patent and that said Letters Patent is hereby corrected as shown below:

On the Title Page

Item (56), in Column 2, under "Other Publications", Line 1, delete "PCT/U918/32348," and insert -- PCT/US18/32348, --, therefor.

In the Specification

In Column 3, Lines 64-65, delete "include include" and insert -- include --, therefor.

In Column 4, Line 46, delete "the a" and insert -- the --, therefor.

In Column 7, Line 4, delete "may include" and insert -- include --, therefor.

In Column 7, Line 10, delete "further may" and insert -- further --, therefor.

In Column 7, Line 55, delete "may include" and insert -- include --, therefor.

In Column 15, Line 27, delete "send( )" and insert -- send( )) --, therefor.

In Column 25, Line 65, delete "quality based" and insert -- quality-based --, therefor.

In Column 28, Line 57, delete "gmali." and insert -- gmail. --, therefor.

In Column 36, Line 55, delete "T×T" and insert -- TXT --, therefor.

In Column 47, Line 53, delete "the a" and insert -- the --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*